(12) United States Patent
Tabata et al.

(10) Patent No.: US 11,725,726 B2
(45) Date of Patent: Aug. 15, 2023

(54) VEHICLE ANOMALY ANALYSIS APPARATUS

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Tooru Matsubara, Toyota (JP); Hiromasa Tatsushiro, Toyota (JP); Kota Fujii, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 312 days.

(21) Appl. No.: 17/092,713

(22) Filed: Nov. 9, 2020

(65) Prior Publication Data
US 2021/0164562 A1 Jun. 3, 2021

(30) Foreign Application Priority Data
Nov. 28, 2019 (JP) .................. 2019-215821

(51) Int. Cl.
*F16H 61/12* (2010.01)
*G07C 5/08* (2006.01)

(52) U.S. Cl.
CPC .......... *F16H 61/12* (2013.01); *G07C 5/0808* (2013.01); *F16H 2061/1264* (2013.01); *F16H 2061/1276* (2013.01)

(58) Field of Classification Search
CPC ............. F16H 61/12; F16H 2061/1264; F16H 2061/1276; F16H 2061/0075; F16H 2061/126; G07C 5/0808; G06F 30/15; G06N 3/06
See application file for complete search history.

(56) References Cited

U.S. PATENT DOCUMENTS

| 5,724,941 | A | 3/1998 | Suzuki et al. |
| 2012/0283066 | A1* | 11/2012 | Nakade ............ F16H 61/12 477/79 |
| 2015/0330504 | A1* | 11/2015 | Yamashita ......... F16H 61/688 192/3.58 |

FOREIGN PATENT DOCUMENTS

| DE | 102014209750 A1 * | 12/2014 | ........ F16H 59/08 |
| JP | H08-200132 A | 8/1996 | |
| JP | 2000-240784 A | 9/2000 | |
| JP | 2005-273805 A | 10/2005 | |
| JP | 6741139 B1 * | 8/2020 | ........ F16H 61/12 |

(Continued)

*Primary Examiner* — Joseph J Dallo
(74) *Attorney, Agent, or Firm* — Oliff PLC

(57) ABSTRACT

A vehicle anomaly analysis apparatus for analyzing an anomaly having occurred in a shift control operation executed in an automatic transmission of a vehicle, by using a rotational speed changed in process of the shift control operation. The vehicle anomaly analysis apparatus specifies cause of the anomaly in the shift control operation, by applying an anomaly-cause specifying model that indicates a relationship between a manner of chronological change of a racing amount and the cause of the anomaly in the shift control operation, to the manner of the chronological change of the racing amount upon occurrence of the anomaly in the shift control operation. The racing amount is an amount of increase of the rotational speed in the process of the shift control operation, relative to a reference rotational speed that is based on a gear ratio and an output rotational speed of the automatic transmission.

11 Claims, 16 Drawing Sheets

(56) References Cited

FOREIGN PATENT DOCUMENTS

| WO | WO-2009106711 A2 | * | 9/2009 | ......... G01N 29/0645 |
| WO | WO-2016074623 A1 | * | 5/2016 | ............. B60K 28/08 |
| WO | WO-2020095651 A1 | * | 5/2020 | |

* cited by examiner

FIG.2

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |
| Rev | ○ | | | ○ | |

C1、C2、B1、B2
CB

VEHICLE ANOMALY ANALYSIS APPARATUS

This application claims priority from Japanese Patent Application No. 2019-215821 filed on Nov. 28, 2019, the disclosure of which is herein incorporated by reference in its entirety.

FIELD OF THE INVENTION

The present invention relates to a vehicle anomaly analysis apparatus for analyzing an anomaly in a shift control operation executed in an automatic transmission.

BACKGROUND OF THE INVENTION

There is well-known a vehicle anomaly analysis apparatus for analyzing an anomaly having occurred in a shift control operation executed in an automatic transmission that constitutes a part of a drive-force transmission path between a drive force source and drive wheels of a vehicle, by using a rotational speed changed in a process of execution of the shift control operation. A transmission-failure detection apparatus disclosed in JP2000-240784A is an example of such an apparatus. This Japanese Patent Application Publication discloses that failure of the automatic transmission is detected based on change of a rotational speed of an engine, wherein the change of the rotational speed of the engine is caused by change of a gear ratio of the automatic transmission to which a drive force of the engine is inputted.

SUMMARY OF THE INVENTION

By the way, there is a case in which it is difficult to specify cause of an anomaly having occurred in the shift control operation executed in the automatic transmission of the vehicle. The occurrence of the anomaly in the shift control operation can be detected, for example, when a rotational speed becomes an abnormal value in process of execution of the shift control operation, more specifically, when a racing amount of the rotational speed becomes an abnormal value deviated from a normal range in the process of the execution of the shift control operation. However, there are cases of occurrences of anomalies in which the racing amount of the rotational speed becomes an abnormal value deviated from the normal range in substantially the same manner even if causes of the respective anomalies are different from each other. Thus, the cause of the anomaly is not necessarily easy to be specified by only seeing an indication that the racing amount becomes an abnormal value.

The present invention was made in view of the background art described above. It is therefore an object of the present invention to provide a vehicle anomaly analysis apparatus capable of improving accuracy in specifying cause of an anomaly in a shift control operation executed in an automatic transmission.

The object indicated above is achieved according to the following aspects of the present invention.

According to a first aspect of the invention, there is provided a vehicle anomaly analysis apparatus for analyzing an anomaly having occurred in a shift control operation executed in an automatic transmission that constitutes a part of a drive-force transmission path between a drive force source and drive wheels of a vehicle, by using a rotational speed changed in process of execution of the shift control operation. The vehicle anomaly analysis apparatus is configured to specify cause of the anomaly in the shift control operation, by applying an anomaly-cause specifying model that indicates a relationship between a manner of chronological change of a racing amount and the cause of the anomaly in the shift control operation, to the manner of the chronological change of the racing amount upon occurrence of the anomaly in the shift control operation, wherein the racing amount is an amount of increase of the rotational speed in the process of the execution of the shift control operation, relative to a reference rotational speed that is based on a gear ratio and an output rotational speed of the automatic transmission. Namely, the vehicle anomaly analysis apparatus is configured to specify cause of the anomaly in the shift control operation, in accordance with the anomaly-cause specifying model, based on the manner of the chronological change of the racing amount upon the occurrence of the anomaly in the shift control operation. Further, the vehicle anomaly analysis apparatus may comprise: a state determining portion configured to determine whether the anomaly has occurred in the shift control operation executed in the automatic transmission of the vehicle; and an anomaly-cause specifying portion configured, when it is determined by the state determining portion that the anomaly has occurred in the shift control operation executed in the automatic transmission of the vehicle, to obtain data representing at least the manner of the chronological change of the racing amount upon the occurrence of the anomaly in the shift control operation, and to specify the cause of the anomaly in the shift control operation, by using the obtained data and the anomaly-cause specifying model.

According to a second aspect of the invention, in the vehicle anomaly analysis apparatus according to the first aspect of the invention, the anomaly-cause specifying model is realized by a supervised learning that is a machine learning using, as teaching data, the manner of chronological change of the racing amount upon the occurrence of the anomaly in the shift control operation and the cause of the anomaly in the shift control operation.

According to a third aspect of the invention, in the vehicle anomaly analysis apparatus according to the first or second aspect of the invention, the anomaly in the shift control operation is shifting malfunction of the automatic transmission that includes a hydraulically-operated frictional engagement device, wherein an operation state of the frictional engagement device is to be switched in the execution of the shift control operation.

According to a fourth aspect of the invention, in the vehicle anomaly analysis apparatus according to the third aspect of the invention, the cause of the anomaly in the shift control operation is suction of air by an oil pump that is provided to output a working fluid used to switch the operation state of the frictional engagement device.

According to a fifth aspect of the invention, in the vehicle anomaly analysis apparatus according to the third or fourth aspect of the invention, the cause of the anomaly in the shift control operation is malfunction of a control valve that is provided to regulate a hydraulic pressure of a working fluid used to switch the operation state of the frictional engagement device.

According to a sixth aspect of the invention, in the vehicle anomaly analysis apparatus according to any one of the third through fifth aspects of the invention, the cause of the anomaly in the shift control operation is malfunction of a drive unit configured to drive a control valve that is provided to regulate a hydraulic pressure of a working fluid used to switch the operation state of the frictional engagement device.

According to a seventh aspect of the invention, in the vehicle anomaly analysis apparatus according to any one of the first through sixth aspects of the invention, the anomaly-cause specifying model indicates the relationship between the manner of the chronological change of the racing amount and, as the cause of the anomaly in the shift control operation, a cause that is predetermined based on an operation-state representing value representing an operation state of the vehicle, wherein the cause of the anomaly in the shift control operation is to be specified by the operation-state representing value, easier than by the rotational speed.

According to an eighth aspect of the invention, in the vehicle anomaly analysis apparatus according to the seventh aspect of the invention, the operation-state representing value is a value of a hydraulic pressure of a working fluid used to switch an operation state of a hydraulically-operated frictional engagement device included in the automatic transmission, in the execution of the shift control operation.

According to a ninth aspect of the invention, in the vehicle anomaly analysis apparatus according to the first aspect of the invention, the anomaly-cause specifying model further indicates a relationship between a number of occurrences of the anomaly in the shift control operation and the cause of the anomaly in the shift control operation, wherein the cause of the anomaly in the shift control operation is reduction of durability of the automatic transmission.

According to a tenth aspect of the invention, in the vehicle anomaly analysis apparatus according to the ninth aspect of the invention, the anomaly-cause specifying model is realized by a supervised learning that is a machine learning using, as teaching data, the manner of chronological change of the racing amount upon the occurrence of the anomaly in the shift control operation, the number of occurrences of the anomaly in the shift control operation and the reduction of the durability of the automatic transmission.

In the vehicle anomaly analysis apparatus according to the first aspect of the invention, the cause of the anomaly in the shift control operation is determined or specified, by applying the predetermined anomaly-cause specifying model that indicates the relationship between the manner of the chronological change of the racing amount and the cause of the anomaly in the shift control operation, to the manner of the chronological change of the racing amount upon occurrence of the anomaly in the shift control operation, so that it is possible to improve accuracy in specifying the cause of the anomaly in the shift control operation executed in the automatic transmission.

In the vehicle anomaly analysis apparatus according to the second aspect of the invention, the anomaly-cause specifying model is realized by the supervised learning that is the machine learning using, as the teaching data, the manner of the chronological change of the racing amount upon the occurrence of the anomaly in the shift control operation and the cause of the anomaly in the shift control operation, so that it is possible to construct a learning model by which the cause of the anomaly in the shift control operation can be specified with an improved accuracy.

In the vehicle anomaly analysis apparatus according to the third aspect of the invention, the anomaly in the shift control operation is the shifting malfunction of the automatic transmission, so that the cause of the shifting malfunction of the automatic transmission can be specified with an improved accuracy by using the anomaly-cause specifying model.

In the vehicle anomaly analysis apparatus according to the fourth aspect of the invention, the cause of the anomaly in the shift control operation is the suction of the air by the oil pump. Therefore, even in event of occurrence of the anomaly in the shift control operation, which causes the racing amount of the rotational speed to become an abnormal value, the cause of the anomaly can be specified with an improved accuracy by using the anomaly-cause specifying model.

In the vehicle anomaly analysis apparatus according to the fifth aspect of the invention, the cause of the anomaly in the shift control operation is the malfunction of the control valve. Therefore, even in event of occurrence of the anomaly in the shift control operation, which causes the racing amount of the rotational speed to become an abnormal value, the cause of the anomaly can be specified with an improved accuracy by using the anomaly-cause specifying model.

In the vehicle anomaly analysis apparatus according to the sixth aspect of the invention, the cause of the anomaly in the shift control operation is the malfunction of the drive unit configured to drive the control valve. Therefore, even in event of occurrence of the anomaly in the shift control operation, which causes the racing amount of the rotational speed to become an abnormal value, the cause of the anomaly can be specified with an improved accuracy by using the anomaly-cause specifying model.

In the vehicle anomaly analysis apparatus according to the seventh aspect of the invention, the anomaly-cause specifying model indicates the relationship between the manner of the chronological change of the racing amount and, as the cause of the anomaly in the shift control operation, the cause that is predetermined based on the operation-state representing value, wherein the cause of the anomaly in the shift control operation can be specified by the operation-state representing value, easier than by the rotational speed. Therefore, the cause of the anomaly in the shift control operation can be specified with an improved accuracy in the anomaly-cause specifying model.

In the vehicle anomaly analysis apparatus according to the eighth aspect of the invention, the operation-state representing value is the value of the hydraulic pressure of the working fluid used to switch the operation state of a hydraulically-operated frictional engagement device included in the automatic transmission, in the execution of the shift control operation. Therefore, the cause of the anomaly in the shift control operation can be appropriately specified in the anomaly-cause specifying model.

In the vehicle anomaly analysis apparatus according to the ninth aspect of the invention, the anomaly-cause specifying model further indicates the relationship between the number of occurrences of the anomaly in the shift control operation and the reduction of the durability of the automatic transmission. Therefore, even where the cause of the anomaly in the shift control operation is the reduction of the durability of the automatic transmission, the cause of the anomaly can be specified with an improved accuracy by using the anomaly-cause specifying model.

In the vehicle anomaly analysis apparatus according to the tenth aspect of the invention, the anomaly-cause specifying model is realized by the supervised learning that is the machine learning using, as the teaching data, the manner of chronological change of the racing amount upon the occurrence of the anomaly in the shift control operation, the number of occurrences of the anomaly in the shift control operation and the reduction of the durability of the automatic transmission. Therefore, it is possible to construct a learning model by which the cause of the anomaly in the shift control operation can be specified with an improved accuracy.

BRIEF DESCRIPTION OF THE DRAWINGS

FIG. 2 is a table indicating a relationship between each gear position of a mechanically-operated step-variable transmission portion (shown by way of example in FIG. 1) and a combination of engagement devices of the step-variable transmission portion, which are placed in engaged states to establish the gear position in the step-variable transmission portion;

DETAILED DESCRIPTION OF PREFERRED EMBODIMENTS

In the embodiment of the present invention, a gear ratio in the vehicle transmission is defined as "rotational speed of input-side rotary member/rotational speed of output-side rotary member". A running speed of the vehicle could be lower as the gear ratio is higher, and could be higher as the gear ratio is lower. The highest gear ratio can be expressed also as a lowest-speed gear ratio.

The drive force source is an internal combustion engine such as gasoline engine and diesel engine, which is configured to generate a drive force by combustion of a fuel. Further, the vehicle may include, for example, an electric motor as another drive force source in addition to or in place of the internal combustion engine. The electric motor is broadly interpreted as a kind of an engine.

Hereinafter, preferred embodiments of the invention will be described in detail with reference to the accompanying drawings.

First Embodiment

Figure 1:
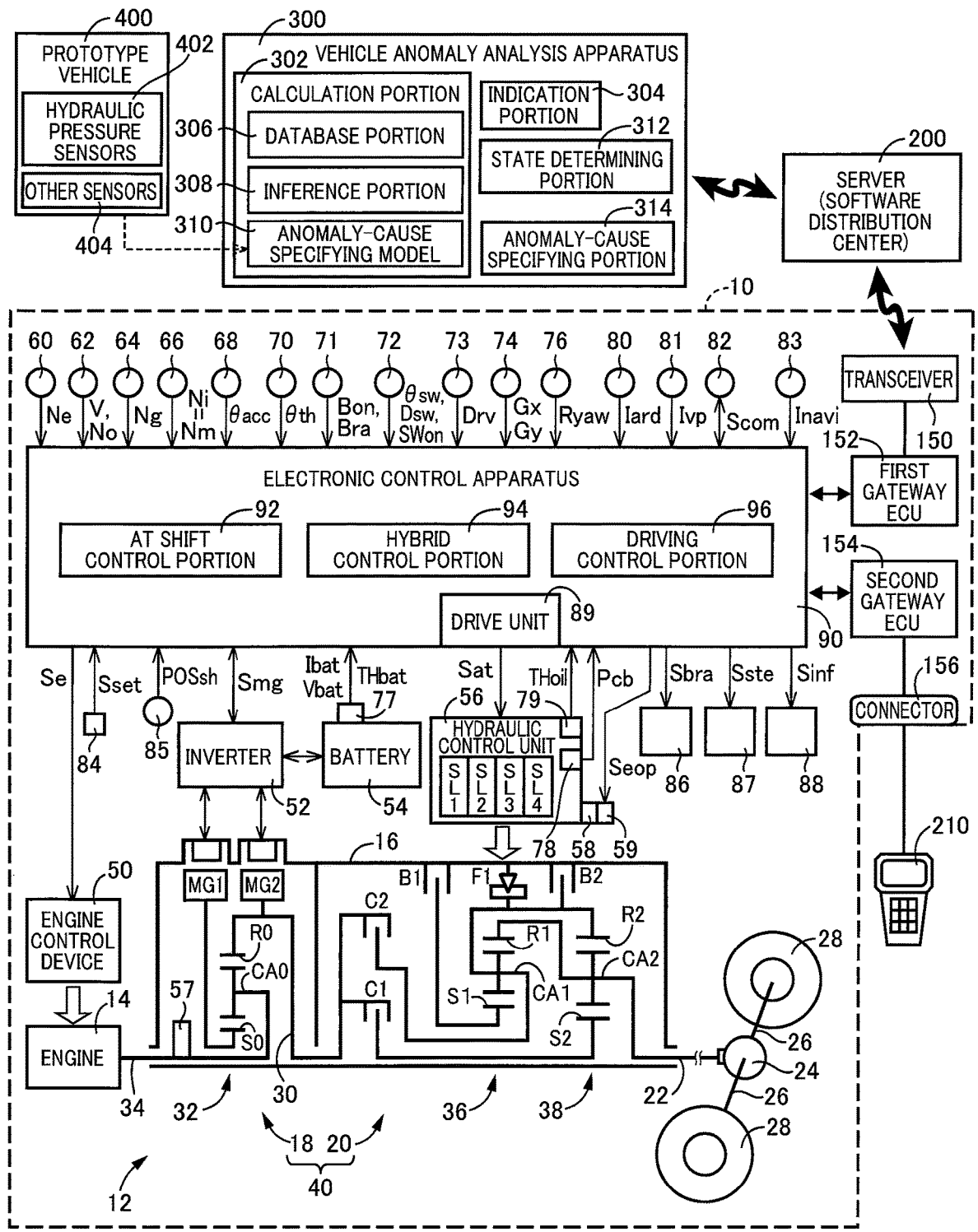
FIG. 1 is a view schematically showing a construction of a vehicle to which the present invention is applied, for explaining major portions of control functions and control systems that are provided to perform various control operations in the vehicle.

FIG. 1 is a view schematically showing a construction of a drive-force transmitting device 12 provided in a vehicle 10 to which the present invention is applied, for explaining major portions of control functions and control systems that are provided to perform various control operations in the vehicle 10. As shown in FIG. 1, the vehicle 10 includes an engine 14 and first and second rotating machines MG1, MG2. The drive-force transmitting device 12 includes a non-rotary member in the form of a transmission casing 16 that is attached to a body of the vehicle 10, an electrically-operated continuously-variable transmission portion 18 and a mechanically-operated step-variable transmission portion 20. The continuously-variable transmission portion 18 and the step-variable transmission portion 20 are provided within the casing 16, and are arranged in a series on a common axis. The continuously-variable transmission portion 18 is connected to the engine 14 directly or indirectly through, for example, a damper (not shown). The step-variable transmission portion 20 is connected to an output rotary member of the continuously-variable transmission portion 18. The drive-force transmitting device 12 further includes a differential gear device 24 connected to an output shaft 22 that is an output rotary member of the step-variable transmission portion 20, and a pair of axles 26 connected to the differential gear device 24. In the drive-force transmitting device 12, a drive force outputted from the engine 14 or the second rotating machine MG2 is transmitted to the step-variable transmission portion 20, and is then transmitted from the step-variable transmission portion 20 through the differential gear device 24 to drive wheels 28 of the vehicle 10, for example. The drive force is synonymous with a drive torque or a drive power unless otherwise distinguished from them. It is noted that the drive-force transmitting device 12 including the continuously-variable transmission portion 18 and the step-variable transmission portion 20 is constructed substantially symmetrically about its axis corresponding to the above-described common axis, so that a lower half of the drive-force transmitting device 12 is not shown in FIG. 1. The above-described common axis corresponds to axes of a crank shaft of the engine 14 and a connecting shaft 34 that is described below.

The engine 14 is a known internal combustion engine such as gasoline engine and diesel engine, which serves as a drive force source capable of generating a drive torque. The vehicle 10 is provided with an engine control device 50 that includes a throttle actuator, a fuel injection device and an ignition device. With the engine control device 50 being controlled by an electronic control apparatus 90 that is described below, an engine torque Te, which is an output torque of the engine 14, is controlled. In the present embodiment, the engine 14 is connected to the continuously-variable transmission portion 18, without a fluid transmitting device (such as a torque converter and a fluid coupling device) disposed therebetween.

Each of the first and second rotating machines MG1, MG2 is a rotating electric machine having a function serving as an electric motor and a function serving as a generator. That is, each of the first and second rotating machines MG1, MG2 is a so-called "motor generator". The first and second rotating machines MG1, MG2 are connected to an electric storage device in the form of a battery 54 provided in the vehicle 10, through an inverter 52 provided in the vehicle 10. The inverter 52 is controlled by the electronic control apparatus 90 whereby an MG1 torque Tg and an MG2 torque Tm as output torques of the respective first and second rotating machines MG1, MG2 are controlled. The output torque of each of the first and second rotating machines MG1, MG2 serves as a power running torque when acting as a positive torque for acceleration, with the each of the first and second rotating machines MG1, MG2 being rotated in a forward direction. The output torque of each of the first and second rotating machines MG1, MG2 serves as a regenerative torque when acting as a negative torque for deceleration, with the each of the first and second rotating machines MG1, MG2 being rotated in the forward direction. The battery 54 is the electric storage device to and from which an electric power is supplied from and to the first rotating machine MG1 and the second rotating machine MG2.

The continuously-variable transmission portion 18 is provided with: the above-described first rotating machine (first motor/generator) MG1; a differential mechanism 32 serving as a drive-force distributing device to mechanically distribute the drive force of the engine 14 to the first rotating machine MG1 and to an intermediate transmitting member 30 that is an output rotary member of the continuously-variable transmission portion 18; and a second rotating machine (second motor/generator) MG2 connected to the intermediate transmitting member 30 in a drive-force transmittable manner. The continuously-variable transmission portion 18 is an electrically-controlled continuously-variable transmission wherein a differential state of the differential mechanism 32 is controllable by controlling an operation state of the first rotating machine MG1. The first rotating machine MG1 serves as a differential rotating machine capable of controlling an engine rotational speed Ne that is a rotational speed of the engine 14. The second rotating machine MG2 serves as a vehicle-driving rotating machine, i.e., a drive force source capable of generating a drive torque driving the vehicle 10. The vehicle 10 is a hybrid vehicle provided with the drive force sources in the form of the engine 14 and the second rotating machine MG2. The drive force of each of the drive forces is to be transmitted to the drive wheels 28 through the drive-force transmitting device 12. It is noted that an operation of the first rotating machine MG1 is controlled by controlling an operation state of the first rotating machine MG1.

The differential mechanism 32 is a planetary gear device of a single-pinion type having a sun gear S0, a carrier CA0 and a ring gear R0. The carrier CA0 is connected to the engine 14 through the connecting shaft 34 in a drive-force transmittable manner, and the sun gear S0 is connected to the first rotating machine MG1 in a drive-force transmittable manner, while the ring gear R0 is connected to the second rotating machine MG2 in a drive-force transmittable manner. In the differential mechanism 32, the carrier CA0 serves as an input rotary element, and the sun gear S0 serves as a reaction rotary element, while the ring gear R0 serves as an output rotary element.

The step-variable transmission portion 20 is a mechanically-operated transmission mechanism which constitutes a part of a drive-force transmission path between the intermediate transmitting member 30 and the drive wheels 28, namely, constitutes a part of a drive-force transmission path between the continuously-variable transmission portion 18 and the drive wheels 28. The intermediate transmitting member 30 also serves as an input rotary member of the step-variable transmission portion 20. The step-variable transmission portion 20 is considered to also as a vehicle transmission constituting a part of a drive-force transmission path between the drive force source (second rotating machine MG2 or engine 14) and the drive wheels 28, since the second rotating machine MG2 is connected to the intermediate transmitting member 30 such that the intermediate transmitting member 30 is rotated together with the second rotating machine MG2, or since the engine 14 is connected to an input rotary member of the continuously-variable transmission portion 18. The intermediate transmitting member 30 is a transmitting member through which the drive force of the drive force source is to be transmitted to the drive wheels 28. The step-variable transmission portion 20 is a known automatic transmission of a planetary gear type which is provided with a plurality of planetary gear devices in the form of a first planetary gear device 36 and a second planetary gear device 38, and a plurality of engagement devices including a clutch C1, a clutch C2, a brake B1 and a brake B2. Hereinafter, the clutch C1, clutch C2, brake B1 and brake B2 will be referred to as engagement devices CB unless otherwise specified.

Each of the engagement devices CB is a hydraulically-operated frictional engagement device in the form of a multiple-disc type or a single-disc type clutch or brake that is to be pressed by a hydraulic actuator, or a band brake that is to be tightened by a hydraulic actuator. A torque capacity of each of the engagement devices CB is to be changed by an engaging pressure Pcb in the form of a corresponding one of hydraulic pressures Pc1, Pc2, Pb1, Pb2 (see FIG. 4) as regulated pressures supplied from a hydraulic control unit (hydraulic control circuit) 56 provided in the vehicle 10, whereby an operation state of each of the engagement devices CB is to be switched among engaged, slipped and released states, for example.

In the step-variable transmission portion 20, selected ones of rotary elements of the first and second planetary gear devices 36, 38 are connected to each other or to the intermediate transmitting member 30, casing 16 or output shaft 22, either directly or indirectly (selectively) through the engagement devices CB or a one-way clutch F1. The rotary elements of the first planetary gear device 36 are a sun gear S1, a carrier CA1 and a ring gear R1. The rotary elements of the second planetary gear device 38 are a sun gear S2, a carrier CA2 and a ring gear R2.

The step-variable transmission portion 20 is shifted to a selected one of a plurality of AT gear positions (speed positions) by engaging actions of selected ones of the engagement devices CB. The plurality of AT gear positions have respective different gear ratios (speed ratios) γat (=AT input rotational speed Ni/output rotational speed No). Namely, the step-variable transmission portion 20 is shifted up and down from one gear position to another by placing selected ones of the engagement devices in the engaged state. The step-variable transmission portion 20 is a step-variable automatic transmission configured to establish a selected one a plurality of gear positions. In the following description of the present embodiment, the gear position established in the step-variable transmission portion 20 will be referred to as AT gear position. The AT input rotational speed Ni is an input rotational speed of the step-variable transmission portion 20 that is a rotational speed of the input rotary member of the step-variable transmission portion 20, which is equal to a rotational speed of the intermediate transmitting member 30, and which is equal to an MG2 rotational speed Nm that is an rotational speed of the second rotating machine MG2. Thus, the AT input rotational speed Ni can be represented by the MG2 rotational speed Nm. The output rotational speed No is a rotational speed of the output shaft 22 that is an output rotational speed of the step-variable transmission portion 20, which is considered to be an output speed of a transmission device (composite transmission) 40 which consists of the continuously-variable transmission portion 18 and the step-variable transmission portion 20. The transmission device 40 is a transmission that constitutes a part of a drive-force transmitting path between the engine 14 and the drive wheels 28.

As shown in a table of FIG. 2, the step-variable transmission portion 20 is configured to establish a selected one of a plurality of AT gear positions in the form of four forward AT gear positions and a reverse AT gear position. The four forward AT gear positions consist of a first speed AT gear position, a second speed AT gear position, a third speed AT gear position and a fourth speed AT gear position, which are represented by "1st", "2nd", "3rd" and "4th" in the table of FIG. 2. The first speed AT gear position is the lowest-speed gear position having a highest gear ratio γat, while the fourth speed AT gear position is the highest-speed gear position having a lowest gear ratio γat. The gear ratio γat decreases in the direction from the first speed AT gear position (lowest-speed gear position) toward the fourth speed AT gear position (highest-speed gear position). The reverse AT gear position is represented by "Rev" in the table of FIG. 2, and is established by, for example, engagements of the clutch C1 and the brake B2. That is, when the vehicle 10 is to run in reverse direction, the first speed AT gear position is established, for example, as described below. The table of FIG. 2 indicates a relationship between each of the AT gear positions of the step-variable transmission portion 20 and operation states of the respective engagement devices CB of the step-variable transmission portion 20, namely, a relationship between each of the AT gear positions and a combination of ones of the engagement devices CB, which are to be placed in theirs engaged states to establish the each of the AT gear positions. In the table of FIG. 2, "O" indicates the engaged state of the engagement devices CB, "A" indicates the engaged state of the brake B2 during application of an engine brake to the vehicle 10 or during a coasting shift-down action of the step-variable transmission portion 20, and the blank indicates the released state of the engagement devices CB.

The step-variable transmission portion 20 is configured to switch from one of the AT gear positions to another one of the AT gear positions, namely, to establish one of the AT gear positions which is selected, by the electronic control apparatus 90, according to, for example, an accelerating operation made by a vehicle driver (operator) and the vehicle running speed V. The step-variable transmission portion 20 is shifted up or down from one of the AT gear positions to another, for example, by so-called "clutch-to-clutch" shifting operation that is made by releasing and engaging actions of selected two of the engagement devices CB, namely, by a releasing action of one of the engagement devices CB and an engaging action of another one of the engagement devices CB. In the following description of the present embodiment, a shift down action from the second speed AT gear position to the first speed AT gear position will be referred to as shift down action from 2nd to 1st. The other shift down and up actions will be referred in the same way.

The vehicle 10 further includes an MOP 57 that is a mechanically-operated oil pump and an EOP 58 that is an electrically-operated oil pump. The MOP 57 is connected to the connecting shaft 34, and is to be rotated together with rotation of the engine 14, so as to output a working fluid OIL that is to be used in the drive-force transmitting device 12. The EOP 58 is to be orated by a motor 59 which is provided in the vehicle 10 and which serves exclusively for the EOP 58, so as to output the working fluid OIL. The working fluid OIL outputted by the MOP 57 and the EOP 58 is used for switching the operation state of each of the engagement devices CB in the step-variable transmission portion 20.

Figure 3:
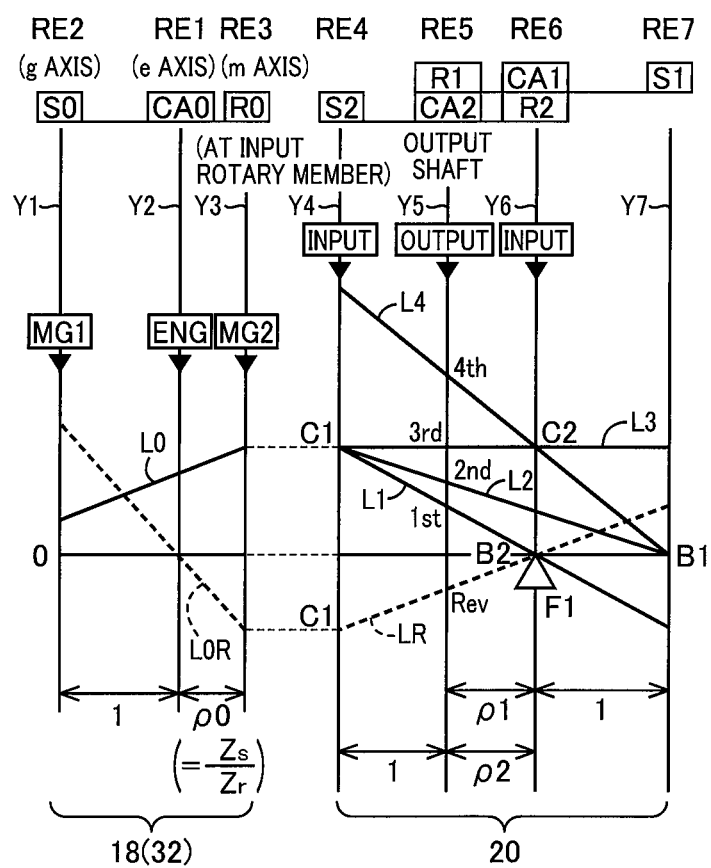
FIG. 3 is a collinear chart indicating a relationship among rotational speeds of rotary elements of an electrically-controlled continuously-variable transmission portion and the mechanically-operated step-variable transmission portion.

FIG. 3 is a collinear chart representative of a relative relationship of rotational speeds of the rotary elements in the continuously-variable transmission portion 18 and the step-variable transmission portion 20. In FIG. 3, three vertical lines Y1, Y2, Y3 corresponding to the three rotary elements of the differential mechanism 32 constituting the continuously-variable transmission portion 18 are a g-axis representative of the rotational speed of the sun gear S0 corresponding to a second rotary element RE2, an e-axis representative of the rotational speed of the carrier CA0 corresponding to a first rotary element RE1, and an m-axis representative of the rotational speed of the ring gear R0 corresponding to a third rotary element RE3 (i.e., the input rotational speed of the step-variable transmission portion 20) in order from the left side. Four vertical lines Y4, Y5, Y6, Y7 of the step-variable transmission portion 20 are axes respectively representative of the rotational speed of the sun gear S2 corresponding to a fourth rotary element RE4, the rotational speed of the ring gear R1 and the carrier CA2 connected to each other and corresponding to a fifth rotary element RE5 (i.e., the rotational speed of the output shaft 22), the rotational speed of the carrier CA1 and the ring gear R2 connected to each other and corresponding to a sixth rotary element RE6, and the rotational speed of the sun gear S1 corresponding to a seventh rotary element RE7 in order from the left. An interval between the vertical lines Y1, Y2, Y3 is determined in accordance with a gear ratio ρ0 of the differential mechanism 32. An interval between the vertical lines Y4, Y5, Y6, Y7 is determined in accordance with gear ratios ρ1, ρ2 of the first and second planetary gear devices 36, 38. When an interval between the sun gear and the carrier is set to an interval corresponding to "1" in the relationship between the vertical axes of the collinear chart, an interval corresponding to the gear ratio ρ (=the number Zs of teeth of the sun gear/the number Zr of teeth of the ring gear) of the planetary gear device is set between the carrier and the ring gear.

In representation using the collinear chart of FIG. 3, in the differential mechanism 32 of the continuously-variable transmission portion 18, the engine 14 (see "ENG" in FIG. 3) is connected to the first rotary element RE1; the first rotating machine MG1 (see "MG1" in FIG. 3) is connected to the second rotary element RE2; the second rotating machine MG2 (see "MG2" in FIG. 3) is connected to the third rotary element RE3 that is to be rotated integrally with the intermediate transmitting member 30; and therefore, the rotation of the engine 14 is transmitted via the intermediate transmitting member 30 to the step-variable transmission portion 20. In the continuously-variable transmission portion 18, the relationship between the rotational speed of the sun gear S0 and the rotational speed of the ring gear R0 is indicated by straight lines L0 and L0R crossing the vertical line Y2.

In the step-variable transmission portion 20, the fourth rotary element RE4 is selectively connected through the clutch C1 to the intermediate transmitting member 30; the fifth rotary element RE5 is connected to the output shaft 22; the sixth rotary element RE6 is selectively connected through the clutch C2 to the intermediate transmitting member 30 and selectively connected through the brake B2 to the casing 16; and the seventh rotary element RE7 is selectively connected through the brake B1 to the casing 16. In the step-variable transmission portion 20, the rotational speeds of "1st", "2nd", "3rd", "4th", and "Rev" of the output shaft 22 are indicated by respective straight lines L1, L2, L3, L4, LR crossing the vertical line Y5 in accordance with engagement/release control of the engagement devices CB.

The straight line L0 and the straight lines L1, L2, L3, L4 indicated by solid lines in FIG. 3 indicate the relative speeds of the rotary elements during forward running in a hybrid running mode enabling a hybrid running in which at least the engine 14 is used as the drive force source for driving the vehicle 10. In this hybrid running mode, when a reaction torque, i.e., a negative torque from the first rotating machine MG1, is inputted in positive rotation to the sun gear S0 with respect to the engine torque Te inputted to the carrier CA0 in the differential mechanism 32, an engine direct transmission torque Td [$=Te/(1+\rho0)=\rho(1/\rho0)\times Tg$] appears in the ring gear R0 as a positive torque in positive rotation. A combined torque of the engine direct transmission torque Td and the MG2 torque Tm is transmitted as the drive torque of the vehicle 10 in the forward direction depending on a required drive force to the drive wheels 28 through the step-variable transmission portion 20 having any AT gear position formed out of the AT first to AT fourth gear positions. In this case, the first rotating machine MG1 functions as an electric generator generating a negative torque in positive rotation. A generated electric power Wg of the first rotating machine MG1 is stored in the battery 54 or consumed by the second rotating machine MG2. The second rotating machine MG2 outputs the MG2 torque Tm by using all or a part of the generated electric power Wg or using the electric power from the battery 54 in addition to the generated electric power Wg.

In the differential mechanism 32 during a motor drive mode in which the vehicle 10 is driven with a drive force generated by the second motor/generator MG2 operated as a drive power source while the engine 14 is stopped (held at rest), the carrier CA0 is held stationary while the MG2 torque Tm that is a positive torque is applied to the ring gear R0 and rotating the ring gear R0 in the positive direction. The state of the differential mechanism 32 in this motor drive mode is not shown in the collinear chart of FIG. 3. At this time, the first motor/generator MG1 connected to the sun gear S0 is placed in a non-load state and freely rotatable in the negative direction. Namely, in the motor drive mode, the engine 14 is held in its non-operated state, so that a rotational speed Ne of the engine 14 (engine rotational speed Ne) is kept zero, and the vehicle 10 is driven in the forward direction with the MG2 torque Tm (positive forward driving torque), which is transmitted as a forward drive torque to the drive wheels 28 through the step-variable transmission portion 20 placed in one of the first through fourth speed AT gear positions. During the forward running in the motor running mode, the MG2 torque Tm is a power running torque that is a positive torque in positive rotation.

The straight lines L0R and LR indicated by broken lines in FIG. 3 indicate the relative speeds of the rotary elements in reverse running in the motor running mode. During reverse running in this motor running mode, the MG2 torque Tm is inputted to the ring gear R0 as a negative torque in negative rotation, and the MG2 torque Tm is transmitted as the drive torque of the vehicle 10 in a reverse direction to the drive wheels 28 through the step-variable transmission portion 20 in which the AT first gear position is established. The vehicle 10 can perform the reverse running when the electronic control apparatus 90 causes the second rotating machine MG2 to output a reverse MG2 torque Tm having a positive/negative sign opposite to a forward MG2 torque Tm during forward running while a forward low-side AT gear position, for example, the AT first gear position, is established as one the plurality of AT gear positions. During the reverse running in the motor running mode, the MG2 torque Tm is a power running torque that is a negative torque in negative rotation. In this case, the forward MG2 torque Tm is a power running torque that is a positive torque in positive direction, and the reverse MG2 torque Tm is a power running torque that is a negative torque in negative direction. In this way, the vehicle 10 performs the reverse running by inverting positiveness/negativeness of the MG2 torque Tm with the forward AT gear position. Using the forward AT gear position means using the same AT gear position as when the forward running is performed. Even in the hybrid running mode, the reverse running can be performed as in the motor running mode since the second rotating machine MG2 can be rotated in negative direction as indicated by the straight line L0R.

In the drive-force transmitting device 12, the continuously-variable transmission portion 18 constitutes an electric transmission mechanism that includes the differential mechanism 32 having three rotary elements, wherein the three rotary elements consist of the first rotary element RE1 in the form of the carrier CA0 to which the engine 14 is connected in a drive-force transmittable manner, the second rotary element RE2 in the form of the sun gear S0 to which the first rotating machine MG1 is connected in a drive-force transmittable manner, and the third rotary element RE3 in the form of the ring gear R0 to which the intermediate transmitting member 30 is connected, and wherein the differential state of the differential mechanism 32 is controlled by controlling the operation state of the first rotating machine MG1. From another viewpoint, the third rotary element RE3 having the intermediate transmitting member 30 connected thereto is the third rotary element RE3 to which the second rotating machine MG2 is connected in a drive-force transmittable manner. That is, in the drive-force transmitting device 12, the continuously-variable transmission portion 18 has the differential mechanism 32 to which the engine 14 is connected in a drive-force transmittable manner and the first rotating machine MG1 connected to the differential mechanism 32 in a drive-force transmittable manner, such that the differential state of the differential mechanism 32 is controlled by controlling the operation state of the first rotating machine MG1. The continuously-variable transmission portion 18 is operated as an electric continuously variable transmission driven to change a gear ratio $\gamma0$ ($=Ne/Nm$) that is a ratio of the engine rotational speed Ne to the MG2 rotational speed Nm, wherein the engine rotational speed Ne is equal to the rotational speed of the connecting shaft 34 serving as an input rotary member of the continuously-variable transmission portion 18 while the MG2 rotational speed Nm is equal to the rotational speed of the intermediate transmitting member 30 serving as an output rotating member of the continuously-variable transmission portion 18.

For example, in the hybrid running mode, when the rotational speed of the sun gear S0 is increased or reduced by controlling the rotational speed of the first rotating machine MG1 relative to the rotational speed of the ring gear R0 that is restrained by the rotation of the drive wheels 28 since one of the AT gear positions is established in the step-variable transmission portion 20, the rotational speed of the carrier CA0, i.e., the engine rotational speed Ne, is increased or reduced. Therefore, in the hybrid running, the engine 14 can be operated at an efficient operating point. Thus, a continuously variable transmission can be constituted by cooperation of the step-variable transmission portion 20 having one of the AT gear position is established therein and the continuously-variable transmission portion 18 operated as a continuously variable transmission, as the whole of the transmission device 40 in which the continuously-variable transmission portion 18 and the step-variable transmission portion 20 are arranged in series.

Alternatively, since a shifting operation can be performed in the continuously-variable transmission portion 18 as in a step-variable transmission, a shifting operation can be performed as in a step-variable transmission by using the step-variable transmission portion 20 having one of the AT gear positions established therein and the continuously-variable transmission portion 18 in which a shifting operation is performed as in a step-variable transmission, as the whole of the transmission device 40. In other words, in the transmission device 40, the step-variable transmission portion 20 and the continuously-variable transmission portion 18 can be controlled so as to selectively establish a plurality of gear positions that are different in the gear ratio $\gamma t$ ($=Ne/No$) indicative of the ratio of the engine rotational speed Ne to the output rotational speed No. In the present embodiment, the gear position established in the transmission device 40 is referred to as an overall gear position (although it may be referred also to as a conceptual gear position). The gear ratio $\gamma t$ is an overall gear ratio of the transmission device 40 consisting of the continuously-variable transmission portion 18 and the step-variable transmission portion 20 which are disposed in series with each other. The overall gear ratio $\gamma t$ is equal to a product of the gear ratio $\gamma 0$ of the continuously-variable transmission portion 18 and the gear ratio $\gamma at$ of the step-variable transmission portion 20, namely, $\gamma t = \gamma 0 \times \gamma at$.

For example, the overall gear position is assigned such that one or more types are established for each of the AT gear positions of the step-variable transmission portion 20 by combining the AT gear positions of the step-variable transmission portion 20 with one or more types of the gear ratio $\gamma 0$ of the continuously-variable transmission portion 18. For example, the overall gear position is defined in advance such that first through third overall gear positions are established for the first speed AT gear position, the fourth through sixth overall gear positions are established for the second speed AT gear position, seventh through ninth overall gear positions are established for the third speed AT gear position, and the tenth overall gear position is established for the fourth speed AT gear position. In the transmission device 40, the continuously-variable transmission portion 18 is controlled to attain the engine rotational speed Ne by which a desired gear ratio $\gamma t$ is established for the output rotational speed No, so that different gear positions are established with a certain AT gear position being established in the step-variable transmission portion 20. Further, in the transmission device 40, the continuously-variable transmission portion 18 is controlled with switching of the AT gear position in the step-variable transmission portion 20 whereby the overall gear position is switched.

Referring back to FIG. 1, the vehicle 10 is provided with the electronic control apparatus 90 as a controller including the control apparatus which is constructed according to present invention and which is configured to control, for example, the engine 14, continuously-variable transmission portion 18 and step-variable transmission portion 20. FIG. 1 is a view showing an input/output system of the electronic control apparatus 90, and is a functional block diagram for explaining major control functions and control portions if the electronic control apparatus 90. For example, the electronic control apparatus 90 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 90 may be constituted by two or more control units exclusively assigned to perform different control operations such as the engine control operation and the hydraulic-pressure control operation.

The electronic control apparatus 90 receives various input signals based on values detected by respective sensors provided in the vehicle 10. Specifically, the electronic control apparatus 90 receives: an output signal of an engine speed sensor 60 indicative of an engine rotational speed Ne which is a rotational speed of the engine 14; an output signal of an output speed sensor 62 indicative of an output-shaft rotational speed No which is a rotational speed of the output shaft 22 and which corresponds to the running speed V of the vehicle 10; an output signal of a MG1 speed sensor 64 indicative of an MG1 rotational speed Ng which is a rotational speed of the first rotating machine MG1; an output signal of a MG2 speed sensor 66 indicative of an MG2 rotational speed Nm which is a rotational speed of the second rotating machine MG2 and which corresponds to an AT input rotational speed Ni; an output signal of an accelerator-opening degree sensor 68 indicative of an acceleration opening degree $\theta acc$ representing an amount of accelerating operation made by the vehicle driver; an output signal of a throttle-opening degree sensor 70 indicative of a throttle opening degree $\theta th$; an output signal of a brake pedal sensor 71 indicative of a brake-ON signal Bon representing a state of depression of a brake pedal by the vehicle driver to operate wheel brakes and also a braking operation amount Bra representing an amount of depression of the brake pedal by the vehicle driver corresponding to a depressing force applied to the brake pedal; an output signal of a steering sensor 72 indicative of a steering angle $\theta sw$ and a steering direction Dsw of a steering wheel provided in the vehicle 10 and also a steering ON signal SWon representing a state in which the steering wheel is being held by the vehicle driver; an output signal of a driver condition sensor 73 indicative of a driver condition signal Drv representing a condition of the vehicle driver; an output signal of a G senor 74 indicative of a longitudinal acceleration Gx and a lateral acceleration Gy of the vehicle 10; an output signal of a yaw rate sensor 76 indicative of a yaw rate Ryaw that is an angular speed around a vertical axis of the vehicle 10; an output signal of a battery sensor 77 indicative of a battery temperature THba, a charging/discharging electric current Ibat and a voltage Vbat of the battery 54; output signals of respective hydraulic pressure sensors (hydraulic pressure sensor set) 78 indicative of engaging pressures Pcb that are hydraulic pressures of the working fluid OIL for switching the operation states of the respective engagement devices CB; an output signal of a fluid temperature sensor 79 indicative of a working fluid temperature THoil that is a temperature of the working fluid OIL; an output signal of a vehicle-area information sensor 80 indicative of vehicle area information Iard; an output signal of a vehicle location sensor 81 indicative of location information Ivp; an output signal of an external-network communication antenna 82 indicative of an communication signal Scom; an output signal of a navigation system 83 indicative of navigation information Inavi; output signals of drive-assist setting switches 84 indicative of drive-assist setting signals Sset representing a setting made by the vehicle driver for execution of a drive-assist control such as automatic drive control and a cruise control; and an output signal of a shift position sensor 85 indicative of an operation position POSsh of a shift lever provided in the vehicle 10.

Figure 4:
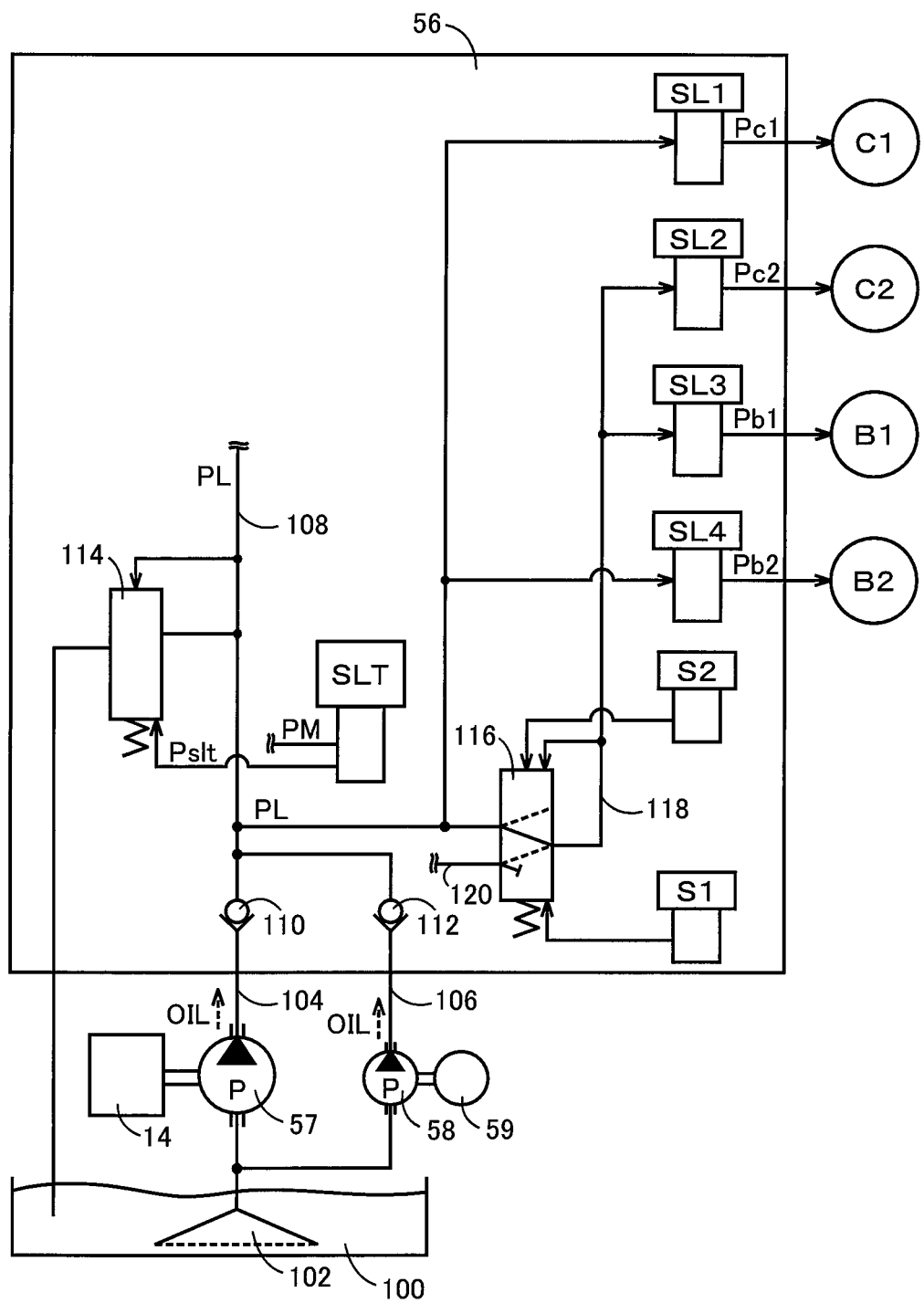
FIG. 4 is a view for explaining a hydraulic control unit and a hydraulic source that is configured to supply a working fluid to the hydraulic control unit.

The engaging pressures Pcb are the hydraulic pressures Pc1, Pc2, Pb1, Pb2 that are output pressures outputted from respective solenoid valves SL1-SL4 and supplied to the respective engagement devices CB (see FIG. 4). The hydraulic pressure sensors 78 include hydraulic pressure sensors configured to detect the hydraulic pressures Pc1, Pc2, Pb1, Pb2 outputted from the respective solenoid valves SL1-SL4.

The amount of accelerating operation made by the vehicle driver is, for example, an amount of operation of an acceleration operating member such as an accelerator pedal, and corresponds to a required output amount that is an amount of output of the vehicle 10 required by the vehicle driver. As the required output amount required by the vehicle driver, the throttle opening degree θth can be used in addition to or in place of the accelerator operation degree θacc, for example.

The driver condition sensor 73 includes a camera configured to photograph, for example, a facial expression and pupils of eyes of the vehicle driver and/or a biometric information sensor configured to detect biometric information of the vehicle driver, so as to detect or obtain directions of his or her eyes and face, movements of his or her eye balls and face and condition of his or her heartbeat, for example.

The vehicle-area information sensor 80 includes a lidar (Light Detection and Ranging), a radar (Radio Detection and Ranging) and/or an onboard camera, for example, so as to directly obtain information relating to a road on which the vehicle 10 is running and information relating to an object or objects present around the vehicle 10. The lidar is constituted by, for example, a plurality of lidar units configured to detect objects present in the respective front, lateral and rear sides of the vehicle 10, or a single lidar unit configured to detect objects present all around the vehicle 10. The lidar is configured to output, as the vehicle area information Iard, object information that is information relating to the detected object or objects. The radar is constituted by, for example, a plurality of radar units configured to detect objects present in the respective front, front vicinity and rear vicinity of the vehicle 10, and to output, as the vehicle area information Iard, object information that is information relating to the detected object or objects. The objected information outputted as the vehicle area information Iard by the lidar and the radar includes a distance and a direction of each of the detected objects from the vehicle 10. The onboard camera is, for example, a monocular camera or a stereo camera configured to capture images of front and rear sides of the vehicle 10, and to output, as the vehicle area information Iard, captured image information that is information relating to the captured images. The captured image information outputted as the vehicle area information Iard by the onboard camera includes information relating to lanes of a running road, signs and parking spaces present on the running road, and at least one other vehicle (that is other than the vehicle 10), pedestrians and obstacles present on the running road.

The vehicle location sensor 81 includes a GPS antenna. The location information Ivp outputted by the vehicle location sensor 81 includes own-vehicle location information indicating a location of the vehicle 10 on the earth's surface or a map based on, for example, GPS signals (Orbit signals) transmitted by GPS (Global Positioning System) satellites.

The navigation system 83 is a known navigation system including a display and a speaker, and is configured to specify a location of the vehicle 10 on pre-stored map data, based on the location information Ivp, and to indicate the location of the vehicle 10 on the map displayed on the display. The navigation system 83 receives a destination point inputted thereto, calculates a running route from a departure point to the destination point, and informs, as instructions, the vehicle driver of the running route, for example, through the display and the speaker. The navigation information Inavi includes map information such as road information and facility information that are based on the map data pre-stored in the navigation system 83. The road information includes information relating to types of roads (such as urban roads, suburban roads, mountain roads and highway load), branching and merging of roads, road gradients, and running speed limits. The facility information includes information of types, locations, names of sites such as supermarkets, shops, restaurants, parking lots, parks, places for repairing the vehicle 10, a home of vehicle's owner and service areas located on the highway load. The service areas are sites which are located on, for example, the highway load, and in which there are facilities for parking, eating, and refueling.

The drive-assist setting switches 84 include an automatic-drive selecting switch for executing the automatic drive control, a cruise switch for executing the cruise control, a switch for setting the vehicle running speed in execution of the cruise control, a switch for setting a distance from another vehicle preceding the vehicle 10 in execution of the cruise control, and a switch for executing a lane keeping control for keeping the vehicle 10 to run within a selected road lane.

The communication signal Scom includes road traffic information that is transmitted and received to and from a center that is an external device such as a road traffic information communication system, and/or inter-vehicle communication information that is directly transmitted and received to and from the at least one other vehicle present in the vicinity of the vehicle 10 without via the center. The road traffic information includes information relating to traffic jams, accidents, road constructions, required travel times, and parking lots on roads. The inter-vehicle communication information includes vehicle information, running information, traffic environment information. The vehicle information includes information indicative of a vehicle type of the at least one other vehicle such as passenger vehicle, truck, and two-wheel vehicle. The running information includes information relating to the at least one other vehicle such as information indicative of the vehicle speed V, location information, brake-pedal operation information, turn-signal-lamp blinking information, and hazard-lamp blinking information. The traffic environment information includes information relating to traffic jams and road constructions.

The electronic control apparatus 90 generates various output signals to the various devices provided in the vehicle 10, such as: an engine control command signal Se that is to be supplied to the engine control device 50 for controlling the engine 14, rotating-machine control command signals Smg that are to be supplied to the inverter 52 for controlling the first and second rotating machines MG1, MG2; hydraulic control command signal Sat that is to be supplied to the hydraulic control unit 56 for controlling the operation states of the engagement devices CB; an EOP control command signal Seop that is to be supplied to the motor 59 for controlling operation of the EOP 58; the communication signal Scom that is to be supplied to the external-network communication antenna 82; a brake-control command signal Sbra that is supplied to a wheel brake device 86, for controlling a braking torque generated by the wheel brake device 86; a steering-control command signal Sste that is to be supplied to a steering device 87, for controlling steering of wheels (especially, front wheels) of the vehicle 10; and an information-notification-control command signal Sinf that is to be supplied to an information notification device 88, for warning and notifying information to the vehicle driver.

The hydraulic control command signal Sat serves also as hydraulic control command signals for controlling shifting actions of the step-variable transmission portion 20, wherein the hydraulic control command signals are provided, for example, for operating the solenoid valves SL1-SL4 (see FIG. 4) configured to regulate the respective hydraulic pressures Pc1, Pc2, Pb1, Pb2 that are to be supplied to hydraulic actuators of the respective engagement devices CB. The electronic control apparatus 90 includes a drive unit (drive circuit) 89 configured to drive valves such as the solenoid valves SL1-SL4. The electronic control apparatus 90 is configured to set hydraulic-pressure command values corresponding to the respective hydraulic pressures Pc1, Pc2, Pb1, Pb2, and to supply drive currents or drive voltages corresponding to the respective hydraulic-pressure command values, to the hydraulic control unit 56 through the drive unit 89.

The wheel brake device 86 is a brake device including wheel brakes each of which is configured to apply a braking torque to a corresponding one of the wheels that include the drive wheels 28 and driven wheels (not shown). The wheel brake device 86 supplies a brake hydraulic pressure to a wheel cylinder provided in each of the wheel brakes in response to a depressing operation of the brake pedal by the vehicle driver, for example. In the wheel brake device 86, normally, a brake master cylinder is configured to generate a master-cylinder hydraulic pressure whose magnitude corresponds to the braking operation amount Bra, and the generated master-cylinder hydraulic pressure is supplied as the brake hydraulic pressure to the wheel cylinder. On the other hand, in the wheel brake device 86, for example, during execution of an ABS control, an anti-skid control, a vehicle-running-speed control or an automatic drive control, the brake hydraulic pressure required for execution of such a control is supplied to the wheel cylinder for enabling the wheel cylinder to generate the required braking torque.

The steering device 87 is configured to apply an assist torque to a steering system of the vehicle 10 in accordance with the vehicle running speed V, steering angle θsw, steering direction Dsw and yaw rate Ryaw, for example. For example, during execution of the automatic driving control, the steering device 87 applies a torque for controlling the steering of the front wheels, to the steering system of the vehicle 10.

The information notification device 88 is configured to give a warning or notification to the vehicle driver in even of a failure in some components involved in the running of the vehicle 10 or deterioration in the functions of the components, for example. The information notification device 88 is constituted by, for example, a display device such as a monitor, a display and an alarm lamp, and/or a sound output device such as a speaker and a buzzer. The display device is configured to visually give a warning or notification to the vehicle driver. The sound output device is configured to aurally give a warning or notification to the vehicle driver.

FIG. 4 is a view for explaining the hydraulic control unit 56 and a hydraulic source that is configured to supply the working fluid OIL to the hydraulic control unit 56. As shown in FIG. 4, the MOP 57 and the EOP 58 are provided in parallel with each other in a hydraulic circuit in which the working fluid OIL is caused to flow. The MOP 57 and EOP 58 are configured to output the working fluid OIL serving as original hydraulic pressures for switching an operation state of each of the engagement devices CB and as lubricant fluids for lubricating various parts of the drive-force transmitting device 12. The MOP 57 and EOP 58 pump up the working fluid OIL returned into an oil pan 100 that is disposed in a lower portion of the casing 16, through a strainer 102 as an inlet port that is common to the MOP 57 and EOP 58, and supply the working fluid OIL to respective fluid delivery passages 104, 106. The fluid delivery passages 104, 106 are connected to a fluid passage of the hydraulic control unit 56, for example, connected to a line-pressure fluid passage 108 through which a line pressure PL is caused to flow. The fluid delivery passage 104, to which the working fluid OIL is to be supplied from the MOP 57, is connected to the line-pressure fluid passage 108 through an MOP check valve 110 that is provided in the hydraulic control unit 56. The fluid delivery passage 106, to which the working fluid OIL is to be supplied from the EOP 58, is connected to the line-pressure fluid passage 108 through an EOP check valve 112 that is provided in the hydraulic control unit 56. The MOP 57 generates a working hydraulic pressure by being rotated together with rotation of the engine 14. The EOP 58 generates a working hydraulic pressure by being rotated by the motor 59, and is capable of generating the working hydraulic pressure, irrespective whether the engine 14 is rotated or not. The EOP 58 is operated to generate the working hydraulic pressure, for example, when the vehicle 10 runs in the motor running mode.

The hydraulic control unit 56 includes, in addition to the above-described line-pressure fluid passage 108, MOP check valve 110, EOP check valve 112 and solenoid valves SL1-SL4, a regulator valve 114, a switch valve 116, a fluid supply passage 118, a fluid discharge passage 120 and solenoid valves SLT, S1, S2.

The regulator valve 114 regulates the line pressure PL that is the working fluid OIL supplied from at least one of the MOP 57 and EOP 58. The solenoid valve SLT, which is a linear solenoid valve, for example, is controlled by the electronic control apparatus 90, so as to supply, to the regulator valve 114, a pilot pressure Pslt that is dependent on, for example, the input torque applied to the step-variable transmission portion 20, whereby the line pressure PL is controlled to a pressure value dependent on, for example, the input torque applied to the step-variable transmission portion 20. The solenoid valve SLT is configured to receive an original pressure in the form of a modulator pressure PM having a certain pressure value, for example, to which the line pressure PL as an original pressure is regulated by a modulator valve (not shown).

The switch valve 116 is configured to establish one of fluid passages that is selected based on the hydraulic pressures supplied from the solenoid valves S1, S2. Each of the solenoid valves S1, S2 is, for example, an ON-OFF solenoid valve, and is controlled by the electronic control apparatus 90, so as to supply the hydraulic pressure to the switch valve 116. When the hydraulic pressure is supplied from the solenoid valve S2 without the hydraulic pressure being supplied from the solenoid valve S1, the switch valve 116 establishes a fluid passage that connects between the line-pressure fluid passage 108 and the fluid supply passage 118. When the hydraulic pressures are supplied from both of the solenoid valve S1 and the solenoid valve S2 or supplied from neither the solenoid valve S1 nor the solenoid valve S2, or when the hydraulic pressure is supplied from the solenoid valve S1 without the hydraulic pressure being supplied from the solenoid valve S2, the switch valve 116 establishes a fluid passage that connects between the fluid discharge passage 120 and the fluid supply passage 118 while blocking the fluid passage between the line-pressure fluid passage 108 and the fluid supply passage 118. The fluid supply passage 118 is a fluid passage through which the hydraulic pressure inputted to each of the solenoid valves SL2, SL3 is caused to flow. The fluid discharge passage 120 is an atmosphere-opening passage through which the working fluid OIL is discharged from the hydraulic control unit 56 toward outside the hydraulic control unit 56, namely, through which the working fluid OIL is returned to the oil pan 100. When the operation position POSsh is a D position selecting a forward running position of the transmission device 40 that enables a forward running of the vehicle 10, for example, the electronic control apparatus 90 supplies, to the hydraulic control unit 56, the hydraulic control command signal Sat which causes the solenoid valve S2 to output the hydraulic pressure and which causes the solenoid valve S1 not to output the hydraulic pressure. When the operation position POSsh is a R position selecting a reverse running position of the transmission device 40 that enables a reverse running of the vehicle 10, for example, the electronic control apparatus 90 supplies, to the hydraulic control unit 56, the hydraulic control command signal Sat which causes the solenoid valves S1, S2 to output the hydraulic pressures.

Each of the solenoid valves SL1-SL4 is, for example, a linear solenoid valve that is controlled by the electronic control apparatus 90, so as to output a corresponding one of the hydraulic pressures Pc1, Pc2, Pb1, Pb2 to a corresponding one of the engagement devices CB. The solenoid valves SL1-SL4 are control valves configured to regulate the engaging pressures Pcb of the respective engagement devices CB. The solenoid valve SL1 receives the line pressure PL as the original pressure and regulates the C1 hydraulic pressure Pc1 that is supplied to the hydraulic actuator of the clutch C1. The solenoid valve SL2 receives the line pressure PL as the original pressure through the switch valve 116 and regulates the C2 hydraulic pressure Pc2 that is supplied to the hydraulic actuator of the clutch C2. The solenoid valve SL3 receives the line pressure PL as the original pressure through the switch valve 116 and regulates the B1 hydraulic pressure Pb1 that is supplied to the hydraulic actuator of the brake B1. The solenoid valve SL4 receives the line pressure PL as the original pressure and regulates the hydraulic pressure Pb2 that is supplied to the hydraulic actuator of the brake B2.

Figure 5:
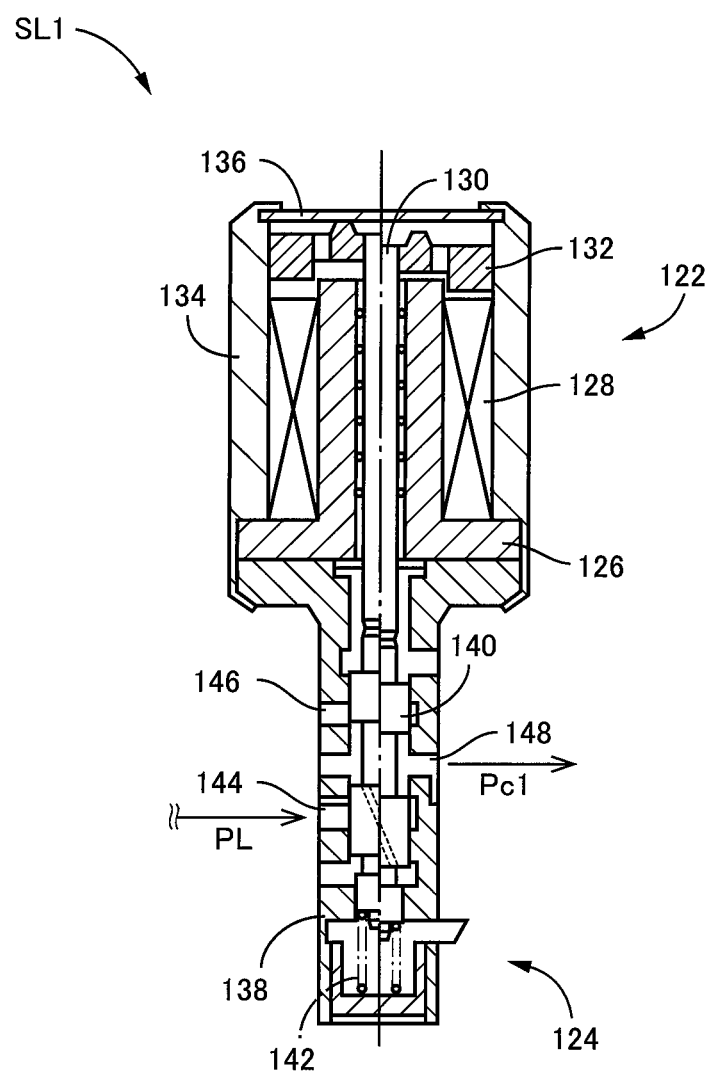
FIG. 5 is a cross sectional view for explaining a linear solenoid valve configured to regulate a hydraulic pressure supplied to a corresponding one of the engagement devices provided in the hydraulic control unit of FIG. 4.
Figure 6:
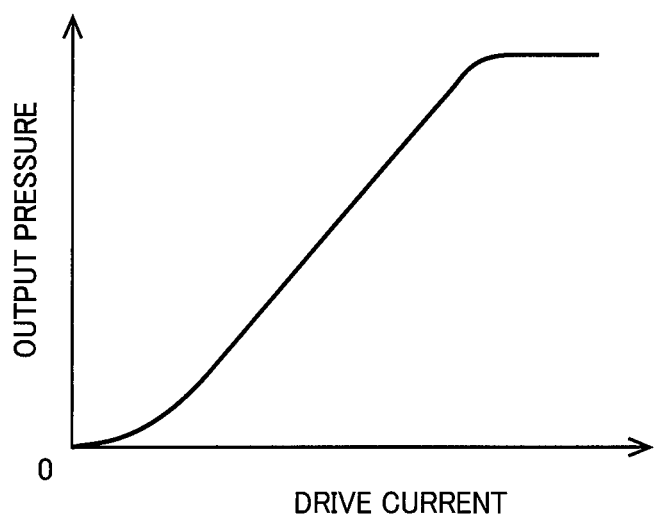
FIG. 6 is a view showing, by way of example, a valve characteristic of the linear solenoid valve of FIG. 5.

FIG. 5 is a cross sectional view for explaining a construction of each of the solenoid valves SL1-SL4. FIG. 5 shows, by way of example, the solenoid valve SL1 as one of the solenoid valves SL1-SL4 that are substantially identical in construction with one another. The solenoid valve SL1 includes a solenoid 122 configured, when being energized, to covert an electric energy into a drive force, and a regulator portion 124 configured, when being driven by the solenoid 122, to regulate the line pressure PL so as to generate the C1 hydraulic pressure Pc1. The solenoid 122 includes a cylindrical-tubular-shaped winding core 126, a coil 128 constituted by a conductor cable wound on a periphery of the winding core 126, a core 130 provided to be axially movable inside the winding core 126, a plunger 132 fixed to one of axially opposite end portions of the core 130 which is remote from the regulator portion 124, a casing 134 storing therein the winding core 126, coil 128, core 130 and plunger 132, and a cover 136 fitted in an opening of the casing 134. The regulator portion 124 includes a sleeve 138 fitted in the casing 134, a spool valve element 140 provided to be axially movable inside the sleeve 138, and a spring 142 constantly forces or biases the spool valve element 140 toward the solenoid 122. The spool valve element 140 is in contact, at one of axially opposite end portions which is on a side of the solenoid 122, with the other of the above-described axially opposite end portions of the core 130, namely, one of the above-described axially opposite end portions of the core 130, which is on a side of the regulator portion 124. In the solenoid valve SL1 constructed as described above, with the drive current being applied to the coil 128, the plunger 132 is moved by a distance that is dependent on an amount of the applied electric current, in an axial direction of the plunger 132, core 130 and spool valve element 140 that are coaxial with one another, and the core 130 and the spool valve element 140 are moved together with the plunger 132 in the axial direction. With the axial movement of the spool valve element 140, a rate of flow of the working fluid OIL introduced through an inlet port 144 and a rate of flow of the working fluid OIL discharged through a drain port 146 are adjusted, so that the line pressure PL inputted through the inlet port 144 is regulated in accordance with the valve characteristic of the linear solenoid valve SL1, which is a predetermined relationship, as shown in FIG. 6 by way of example, between the drive current and an output pressure that corresponds to the C1 hydraulic pressure Pc1 to which the line pressure PL is regulated. The C1 hydraulic pressure Pc1 as the output pressure is outputted through an outlet port 148.

Figure 7:
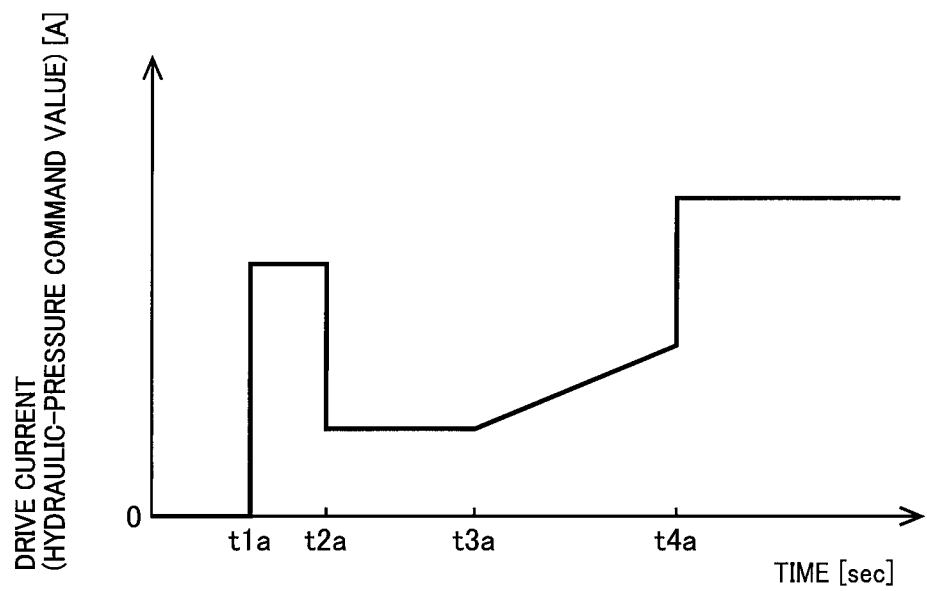
FIG. 7 is a view for explaining, by way of example, a drive current applied to a solenoid valve in process of engagement of a frictional engagement device in a shift control operation executed in a step-variable transmission portion.

FIG. 7 is a view for explaining, by way of example, the drive current in accordance with the hydraulic-pressure command value, which is applied to the solenoid valve SL configured to regulate the hydraulic pressure of an engaging-side frictional engagement device as one of the engagement devices CB that is to be engaged in a shift control operation executed in the step-variable transmission portion 20, in process of engagement of the engaging-side frictional engagement device. In FIG. 7, a time point t1a indicates a point of time at which output of the hydraulic control command signal Sat is started for the engaging-side frictional engagement device in the shift control operation executed in the step-variable transmission portion 20. In a quick apply period from the start of the output of the hydraulic control command signal Sat until a time point t2a, the drive current is drastically increased. Then, in a constant-pressure stand-by period until a time point t3, the drive current is kept substantially at a constant value by which the engaging pressure Pcb of the engaging-side frictional engagement device becomes a constant stand-by pressure for placing the engaging-side frictional engagement device in a pre-engaged state that is a state shortly before the engagement. Then, in a sweep period until a synchronization determination is made, namely, until it is determined that the MG2 rotational speed Nm or the engine rotational speed Ne becomes synchronized with a rotational speed that is dependent on a gear ratio established upon completion of a shifting action executed in the step-variable transmission portion 20, the drive current is controlled to be gradually increased such that the engaging pressure Pcb of the engaging-side frictional engagement device is slowly increased (see point time t3a to point time t4a). When the synchronization determination has been made, the drive current is increased to a maximum value (see point time t4a).

Referring back to FIG. 1, the vehicle 10 further includes a transceiver 150, a first gateway ECU 152, a second gateway ECU 154 and a connector 156.

The transceiver 150 is a device configured to communicate with a server 200 as an external device which is present apart from the vehicle 10 and is provided outside the vehicle 10. The server 200 is a system present on a network outside the vehicle 10, and is configured to receive, process, analyze, store and supply various information such as vehicle state information and vehicle phenomenon information. The server 200 transmits and receives the various information to and from the above-described at least one other vehicle as well as to and from the vehicle 10. However, the transceiver 150 may have a function for directly communicating with the at least one other vehicle present in the vicinity of the vehicle 10 without via the server 200. The vehicle state information represents, for example, an operation or driving state relating to driving of the vehicle 10, which is detected by the various sensors or the like. This driving state is represented, for example, by the accelerator operation degree θacc and the vehicle running speed V. The vehicle phenomenon information represents, for example, phenomenons caused in the vehicle 10. These phenomenons are, for example, an acoustic pressure, i.e., a sound or noise inside the vehicle 10, which is detected by a microphone (not shown) and a vibration felt by the vehicle driver and passengers in the vehicle 10, which is detected by the G sensor 74. It is noted that the transceiver 150 may communicate with the server 200 via the external-network communication antenna 82 by a radio or wireless communication.

Each of the first and second gateway ECUs 152, 154 has substantially the same hardware construction as the electronic control apparatus 90, and is constituted by, for example, a relay device provided to rewrite programs and/or data stored in a rewritable ROM included in the electronic control apparatus 90. The first gateway ECU 152 is connected to the transceiver 150, and is configured to rewrite the programs stored in the ROM, for example, through the wireless communication between transceiver 150 and the server 200. The server 200 serves as a software distribution center configured to distribute programs for the rewriting. The second gateway ECU 154 is mechanically connectable through the connector 156 to an external rewriting device 210 as an external device that is present apart from the vehicle 10, and is configured to rewrite the programs stored in the ROM provided in the electronic control apparatus 90, for example, through the external rewriting device 210.

For performing various control operations in the vehicle 10, the electronic control apparatus 90 includes an AT shift control means or portion in the form of an AT shift control portion 92, a hybrid control means or portion in the form of a hybrid control portion 94 and a driving control means or portion in the form of a driving control portion 96.

Figure 8:
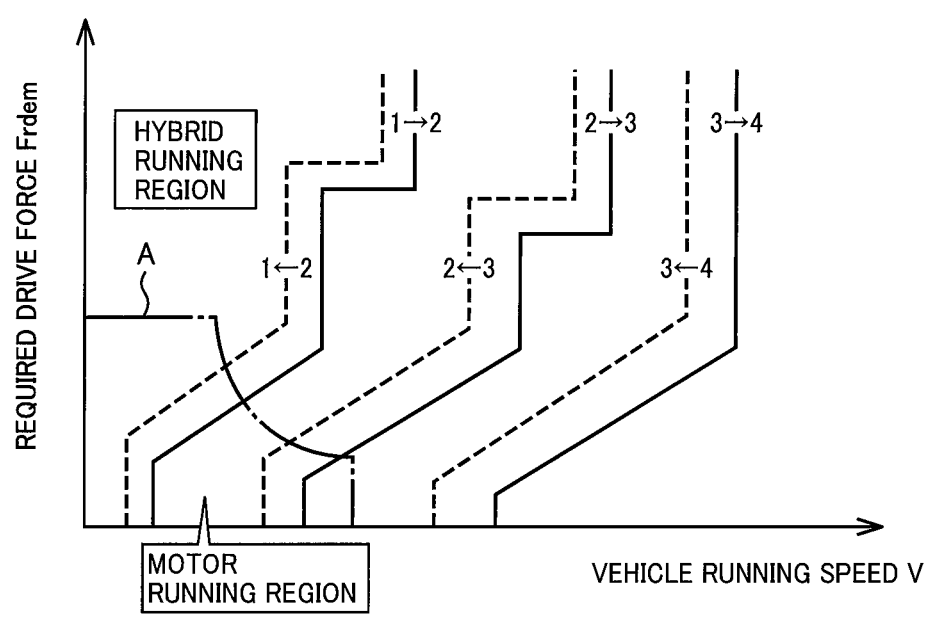
FIG. 8 is a view showing, by way of examples, a shifting map used for controlling gear shifting in the step-variable transmission portion, a drive-force-source switching map used for switching between a hybrid running and a motor running, and a relationship between the shifting map and the drive-force-source switching map.

The AT shift control portion 92 is configured to determine a shifting action of the step-variable transmission portion 20, by using, for example, an AT gear position shift map as shown in FIG. 8, which is a relationship obtained by experimentation or determined by an appropriate design theory, and outputs the hydraulic control command signal Sat supplied to the hydraulic control unit 56, so as to execute the shift control operation in the step-variable transmission portion 20 as needed. The AT gear position shifting map is a predetermined relationship between two variables in the form of the vehicle running speed V and the required drive force Frdem, for example, which relationship is used to determine a shifting action of the step-variable transmission portion 20 and is represented by shifting lines in two-dimensional coordinates in which the running speed V and the required drive force Frdem are taken along respective two axes. It is noted that one of the two variables may be the output rotational speed No in place of the vehicle running speed V and that the other of the two variables may be the required drive torque Trdem, accelerator opening degree θacc or throttle valve opening degree θth in place of the required drive force Frdem. The shifting lines in the AT gear position shifting map consist of shift-up lines (indicated by solid lines in FIG. 8) for determining a shift-up action of the step-variable transmission portion 20, and shift-down lines (indicated by broken lines in FIG. 8) for determining a shift-down action of the step-variable transmission portion 20.

The hybrid control portion 94 has a function serving as an engine control means or portion for controlling the operation of the engine 14 and a function serving as a rotating machine control means or portion for controlling the operations of the first rotating machine MG1 and the second rotating machine MG2 via the inverter 52, and executes a hybrid drive control, for example, using the engine 14, the first rotating machine MG1 and the second rotating machine MG2 through these control functions. The hybrid control portion 94 calculates a drive request amount in the form of the required drive force Frdem that is to be applied to the drive wheels 28, by applying the accelerator opening degree θacc and the vehicle running speed V to, for example, a drive request amount map that is a predetermined relationship. The required drive torque Trdem [Nm] applied to the drive wheels 28, a required drive power Prdem [W] applied to the drive wheels 28, a required AT output torque applied to the output shaft 22, etc. can be used as the drive request amount, in addition to the required drive force Frdem [N].

The hybrid control portion 94 outputs the engine control command signal Se for controlling the engine 14 and the rotating-machine control command signals Smg for controlling the first and second rotating machines MG1, MG2, by taking account of a maximum charging amount Win of electric power that can be charged to the battery 54, and a maximum discharging amount Wout of electric power that can be discharged from the battery 54, such that the required drive power Prdem based on the required drive torque Trdem and the vehicle running speed V is obtained. The engine control command signal Se is, for example, a command value of an engine power Pe that is the power of the engine 14 outputting the engine torque Te at the current engine rotation speed Ne. The rotating-machine control command signal Smg is, for example, a command value of the generated electric power Wg of the first rotating machine MG1 outputting the MG1 torque Tg as the reaction torque of the engine torque Te at the MG1 rotation speed Ng which is the MG1 rotation speed Ng at the time of command signal Smg output, and is a command value of a consumed electric power Wm of the second rotating machine MG2 outputting the MG2 torque Tm at the MG2 rotation speed Nm which is the MG2 rotation speed Nm at the time of command signal Smg output.

The maximum charging amount Win of the battery 54 is a maximum amount of the electric power that can be charged to the battery 54, while the maximum discharging amount Wout of the battery 54 is a maximum amount of the electric power that can be discharged from the battery 54. That is, the maximum charging and discharging amounts Win, Wout of the battery 54d define a range of an electric power Pbat of the battery 54 that can be used. The maximum charging and discharging amounts Win, Wout are calculated by the electronic control apparatus 90, for example, based on a battery temperature THbat and a charged state value SOC [%] of the battery 54. The charged state value SOC of the battery 54 is a value indicative of a charged state of the battery 54, i.e., an amount of the electric power stored in the battery 54, and is calculated by the electronic control apparatus 90, for example, based on the charging/discharging electric current Ibat and the voltage Vbat of the battery 54.

For example, when the transmission device 40 is operated as a continuously variable transmission as a whole by operating the continuously variable transmission portion 18 as a continuously variable transmission, the hybrid control portion 94 controls the engine 14 and controls the generated electric power Wg of the first rotating machine MG1 so as to attain the engine rotational speed Ne and the engine torque Te at which the engine power Pe achieving the required drive power Prdem is acquired in consideration of an engine optimum fuel consumption point etc., and thereby provides the continuously variable shift control of the continuously variable transmission portion 18 to change the gear ratio γ0 of the continuously variable transmission portion 18. As a result of this control, the gear ratio γt of the transmission device 40 is controlled in the case of operating the transmission device 40 as a continuously variable transmission.

For example, when the transmission device 40 is operated as a step-variable transmission as a whole by operating the continuously variable transmission portion 18 as in a step-variable transmission, the hybrid control portion 94 uses a predetermined relationship, for example, an overall gear position shift map, to determine a shifting action of the transmission device 40 and provides the shift control of the continuously variable transmission portion 18 so as to selectively establish the plurality of overall gear positions in coordination with the shift control of the AT gear position of the step-variable transmission portion 20 by the AT shift control portion 92. The plurality of overall gear positions can be established by controlling the engine rotational speed Ne by the first rotating machine MG1 in accordance with the vehicle speed V so as to maintain the respective gear ratios γt. The gear ratio γt of each of the overall gear positions may not necessarily be a constant value over the entire region of the vehicle speed V and may be changed in a predetermined region or may be limited by an upper limit, a lower limit, etc. of the rotational speed of each rotary member or element. As described above, the hybrid control portion 94 can provide the shift control in which the engine rotational speed Ne is changed as in a step-variable shift. An overall step-variable shift control of causing the transmission device 40 to perform a shift as in a step-variable transmission as a whole may be provided only in priority to the continuously variable shift control of operating the transmission device 40 as a continuously variable transmission as a whole in the case that, for example, the vehicle driver selects a running mode placing emphasis on running performance such as a sports running mode etc. or the required drive torque Trdem is relatively large; however, the overall step-variable shift control may basically be provided except when a predetermined restriction is placed on provision.

The hybrid control portion 94 selectively establishes the motor running mode or the hybrid running mode as the running mode depending on a driving state, so as to cause the vehicle 10 to run in a selected one of the running modes. For example, the hybrid control portion 94 establishes the motor running mode when the required drive power Prdem is in a motor running region smaller than a predetermined threshold value, and establishes the hybrid running mode when the required drive power Prdem is in a hybrid running region equal to or greater than the predetermined threshold value. In FIG. 8, one-dot chain line A is a boundary line for switching the drive force source for driving the vehicle 10 between at least the engine 14 and only the second rotating machine MG2. That is, the one-dot chain line A of FIG. 8 is a boundary line between the hybrid running region and the motor running region for switching between the hybrid running and the motor running. A predetermined relationship having the boundary line as indicated by the one-dot chain line A of FIG. 8 is an example of a drive-force source switching map defined by the two-dimensional coordinates of variables in the form of the vehicle running speed V and the required drive force Frdem. It is noted that, in FIG. 8, the drive-force source switching map is shown together with AT gear position shift map, for convenience of the description.

The hybrid control portion 94 establishes the motor running mode when the required drive power Prdem is in the motor running region, and establishes the hybrid running mode when the required drive power Prdem is in the hybrid running region. However, even when the required drive power Prdem is in the motor running region, the hybrid control portion 94 establishes the hybrid running mode if the charged state value SOC of the battery 54 is less than a predetermined engine-start threshold value. The motor running mode is a driving state in which the vehicle 10 is caused to run by the driving torque generated by the second rotating machine MG2, with the engine 14 being stopped. The hybrid running mode is a driving state in which the vehicle 10 is caused to run with the engine 14 being operated. The engine-start threshold value is a predetermined threshold value for determining that the state-of-charge value SOC reaches a level at which the engine 14 must forcibly be started for charging the battery 54.

When establishing the hybrid running mode upon stop of operation of the engine 14, the hybrid control portion 94 executes a control for staring the engine 14. For staring the engine 14, the hybrid control portion 94 increases the engine rotational speed Ne by the first rotating machine MG1, and starts the engine 14, by igniting when the engine rotational speed Ne becomes at least a certain speed value that is an ignitable speed value. That is, the hybrid control portion 94 starts the engine 14 by cranking the engine 14 by the first rotating machine MG1.

The driving control portion 96 is capable of executing, as a drive control for driving the vehicle 10, a selected one of a manual drive control for driving the vehicle 10 in accordance with driving operations made by the vehicle driver and a drive assist control for driving the vehicle 10 without depending on the driving operations made by the vehicle driver. The manual drive control is for causing the vehicle 10 to run by manual operations, i.e., the driving operation manually made by the vehicle driver. The manual drive control is a driving method for casing the vehicle 10 to run by the vehicle driver's driving operations such as an accelerating operation, a barking operation and a steering operation. The drive assist control is for causing the vehicle 10 to run, for example, with a drive assist by which the driving operations are automatically assisted. The drive assist is a driving method for causing the vehicle 10 to run, for example, by automatically accelerating, decelerating and braking the vehicle 10, by controls executed by the electronic control apparatus 90, based on the signals and information supplied from the various sensors, without depending on the driving operations made by the vehicle driver, namely, without depending on intentions of the vehicle driver. The drive assist control is, for example, the automatic drive control in which the vehicle 10 is accelerated, decelerated, braked and steered, depending on a target driving state that is automatically determined based on, for example, the map information and the destination point inputted by the vehicle driver. It is noted that the drive assist control may be broadly interpreted to encompass the cruise control in which some of the driving operations such as the steering operation are executed by the vehicle driver while the other driving operations such as the accelerating, decelerating and braking operations are automatically executed.

When a drive-assist mode is not selected with the automatic-drive selecting switch and the cruise switch of the drive-assist setting switches 84 being placed in OFF, the driving control portion 96 establishes a manual drive mode so as to execute the manual drive control. The driving control portion 96 executes the manual drive control by outputting commands for controlling the step-variable transmission portion 20, engine 14 and first and second rotating machines MG1, MG2, wherein the commands are supplied to the AT shift control portion 92 and the hybrid control portion 94.

When an automatic drive mode is selected with the automatic-drive selecting switch of the drive-assist setting switches 84 being placed in ON by the vehicle driver, the driving control portion 96 establishes the automatic drive mode so as to execute the automatic drive control. Specifically, the driving control portion 96 automatically sets a target driving state that is dependent on, for example, the destination point inputted by the vehicle driver, the own-vehicle location information based on the location information Ivp, the map information based on the navigation information Inavi and various information relating to the running road and based on the vehicle area information Iard. The driving control portion 96 executes the automatic drive control for automatically accelerating, decelerating and steering the vehicle 10, based on the set target driving state. To this end, the driving control portion 96 outputs the commands for controlling the step-variable transmission portion 20, engine 14 and rotating machines MG1, MG2, and the outputted commands are supplied to the AT shift control portion 92 and the hybrid control portion 94. Further, in this instance, the driving control portion 96 outputs the brake-control command signal Sbra for obtaining the required braking torque, and the steering-control command signal Sste for controlling steering of the front wheels, wherein the outputted brake-control command signal Sbra and steering-control command signal Sste are supplied to the wheel brake device 86 and the steering device 87, respectively.

By the way, in the vehicle 10, there is a possibility that an anomaly could occur in the shift control operation executed in the step-variable transmission portion 20. The anomaly in the shift control operation executed in the step-variable transmission portion 20 is, for example, shifting malfunction of the step-variable transmission portion 20.

Figure 9:
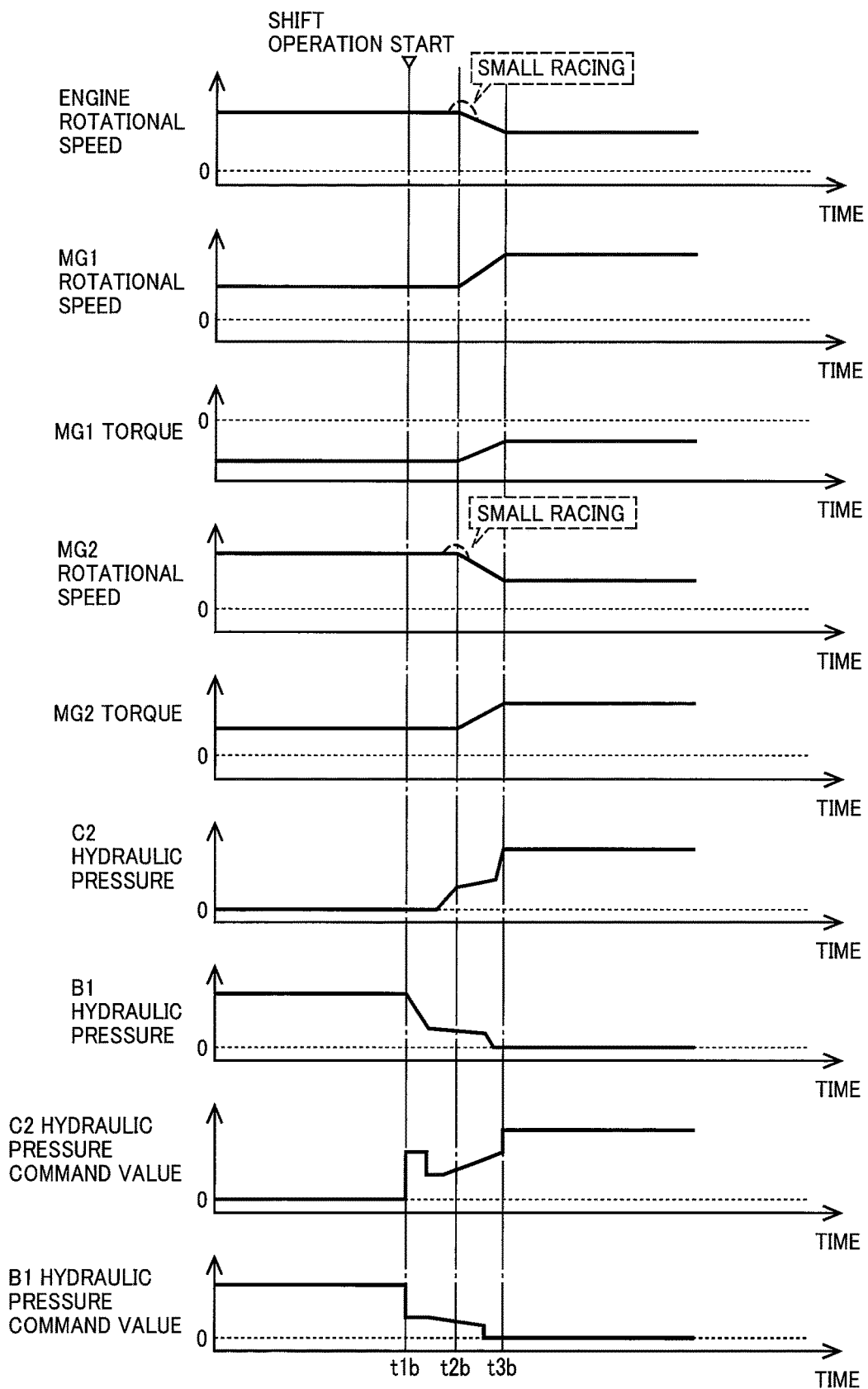
FIG. 9 is a time chart for explaining, by way of example, shifting malfunction of the step-variable transmission portion.

FIG. 9 is a time chart for explaining, by way of example, shifting malfunction of the step-variable transmission portion 20. In FIG. 9, a period from a time point t1b to a time point t3b corresponds to a process of the shift control operation executed in the step-variable transmission portion 20 by which a 2→3 shift-up action of the step-variable transmission portion 20 is executed. In the process of the shift control operation executed in the step-variable transmission portion 20, a learning control operation is executed so as to converge a racing (blowing-up) of a rotational speed Nfx of a rotary member. That is, in the process of the clutch-to-clutch shifting operation of the step-variable transmission portion 20, the learning control operation is executed such that a racing amount ΔNf of the rotational speed Nfx is converged within a predetermined racing amount range RngNf, and the hydraulic-pressure command value is corrected. The rotational speed Nfx is a rotational speed that is to be changed in the process of the shift control operation executed in the step-variable transmission portion 20, and is, for example, the MG2 rotational speed Nm. The above-described racing is a phenomenon that the rotational speed Nfx is increased relative to a reference rotational speed Nref that is based on the gear ratio γat and the output rotational speed No of the step-variable transmission portion 20, in the process of the shift control operation executed in the step-variable transmission portion 20. The racing amount ΔNf is an amount of increase of the rotational speed Nfx upon occurrence of the above-described racing. Where the rotational speed Nfx is the MG2 rotational speed Nm, a racing amount ΔNfm of the MG2 rotational speed Nm is an amount of increase of the MG2 rotational speed Nm relative to a reference rotational speed Nrefm (=γat×No). The predetermined racing amount range RngNf is a normal range of the racing amount ΔNf, which is determined as a small racing amount range in which, for example, a shock or the like is suppressed in the process of the shift control operation executed in the step-variable transmission portion 20. Where the transmission device (composite transmission) 40 is operated as a step-variable transmission as a whole, as described above, a shift control operation is executed in cooperation with the shift control operation executed in the step-variable transmission portion 20 such that a selected one of the overall gear positions is established in the transmission device 40. Therefore, there is a possibility that the racing could occur also in the engine rotational speed Ne that is an input rotational speed of the transmission device 40. In this case, the rotational speed Nfx is, for example, the engine rotational speed Ne that is to be changed in the process of the shift control operation executed in step-variable transmission portion 20. Where the rotational speed Nfx is the engine rotational speed Ne, a racing amount ΔNfe of the engine rotational speed Ne is an amount of increase of the engine rotational speed Ne relative to a reference rotational speed Nrefe (=γ0×γat×No=γt×No).

Specifically described, when the racing amount ΔNf is larger than the predetermined racing amount range RngNf upon occurrence of the racing of the engine rotational speed Ne or the MG2 rotational speed Nm (see vicinity of the time point t2b), an initial pressure value of the C2 hydraulic pressure supplied to the engaging-side frictional engagement device is increased in the next execution of the 2→3 shift-up action. On the other hand, when the racing amount ΔNf is smaller than the predetermined racing amount range RngNf, the initial pressure value of the C2 hydraulic pressure is reduced in the next execution of the 2→3 shift-up action. The initial pressure value is, for example, the hydraulic-pressure command value in the quick apply period (see period from the time point t1a to the time point t2a in FIG. 7) or the hydraulic-pressure command value in the constant-pressure stand-by stage (see period from the time point t2a to the time point t3a in FIG. 7). When the racing amount ΔNf of the engine rotational speed Ne or the MG2 rotational speed Nm is converged within the predetermined racing amount range RngNf by correction of the hydraulic-pressure command value, the learning control operation is completed.

After completion of the learning control operation described above, in case of occurrence of a racing amount anomaly in which the racing amount ΔNf becomes not smaller than a racing-anomaly determination value ΔNffx, it is determined that the shifting malfunction of the step-variable transmission portion 20 has occurred. The racing-anomaly determination value ΔNffx is, for example, a predetermined threshold value which is larger than the predetermined racing amount range RngNf and which is determined for determining that a large degree of racing that causes the shifting malfunction of the step-variable transmission portion 20 has occurred. Further, after completion of the learning control operation described above, in case of occurrence of a tie-up in which the racing amount ΔNf becomes not larger than a tie-up determination value ΔNftu, too, it is determined that the shifting malfunction of the step-variable transmission portion 20 has occurred. The tie-up determination value ΔNftu is, for example, a predetermined threshold value which is smaller than the predetermined racing amount range RngNf and which is determined for determining that the tie-up that causes the racing amount ΔNf to be zero or extremely small has occurred. It is noted that, in the above-described learning control operation, the hydraulic-pressure command value may be corrected such that a racing time in place of the racing amount ΔNf is held within a predetermined length of time. The racing time is a length of time for which the racing continues upon occurrence of the racing of the rotational speed Nfx.

There is a case in which a shifting shock is generated when the racing amount anomaly or the tie-up occurs. After completion of the learning control operation executed in the shift control operation for the step-variable transmission portion 20, in case of generation of the shifting shock causing the longitudinal acceleration Gx to be not lower than a predetermined acceleration value, it is determined that the shifting malfunction of the step-variable transmission portion 20 has occurred. The predetermined acceleration value is, for example, a predetermined threshold value that is determined for determining that the longitudinal acceleration Gx has been increased to a high acceleration value causing the shifting malfunction of the step-variable transmission portion 20.

A vehicle anomaly analysis apparatus 300 (see FIG. 1), which is an external apparatus provided apart from the vehicle 10, is configured, when an anomaly has occurred in the shift control operation executed in the step-variable transmission portion 20, to analyze the anomaly by using the rotational speed Nfx, particularly, determine or specify cause of the anomaly. It can be considered that the vehicle anomaly analysis apparatus 300 cooperates with the electronic control device 90 of the vehicle 10, or with the server 200 and the electronic control device 90 of the vehicle 10, to constitute a vehicle anomaly analysis system for analyzing the anomaly having occurred in the shift control operation executed in the step-variable transmission portion 20.

As described above, after the learning control operation executed in the shift control operation of the step-variable transmission portion 20 has been completed, it is possible to detect occurrence of the shifting malfunction of the step-variable transmission portion 20, by seeing an indication that the racing amount ΔNf of the rotational speed Nfx has become deviated from the predetermined racing amount range RngNf and has become not smaller than the racing-anomaly determination value ΔNffx or not larger than the tie-up determination value ΔNftu. However, the cause of the anomaly is not necessarily easy to be specified by only seeing an indication that the racing amount ΔNf becomes an abnormal value.

Figure 10:
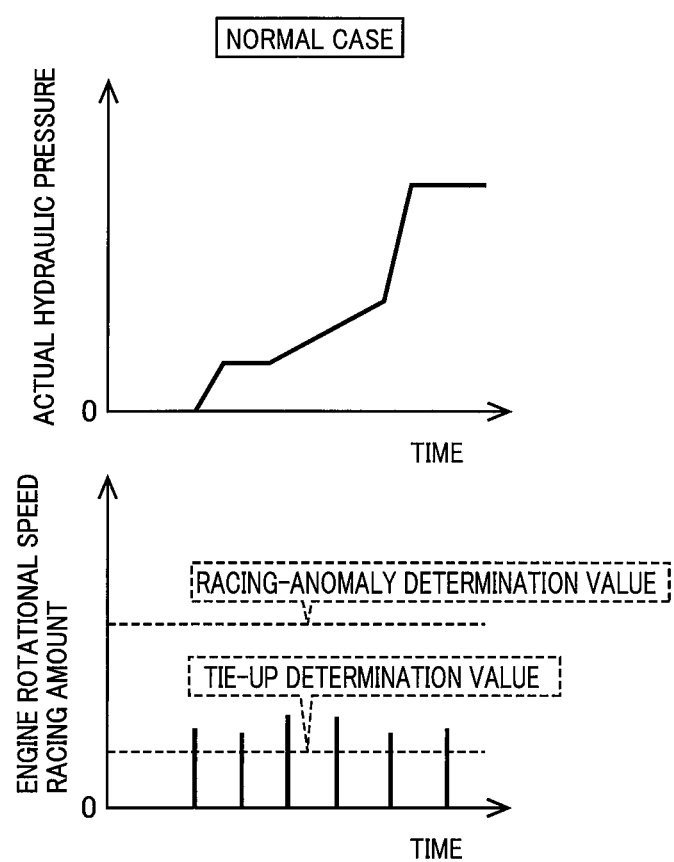
FIGS. 10-13 are views for showing, by way of examples, a normal case and anomaly cases, in an arrangement in which an engaging pressure is controlled directly by the solenoid valve, wherein the views of FIG. 10 show the normal case, the views of FIG. 11 show the anomaly case with an air suction, the views of FIG. 12 show the anomaly case with a temporary stuck, and the views of FIG. 13 show the anomaly case with a complete stuck.
Figure 11:
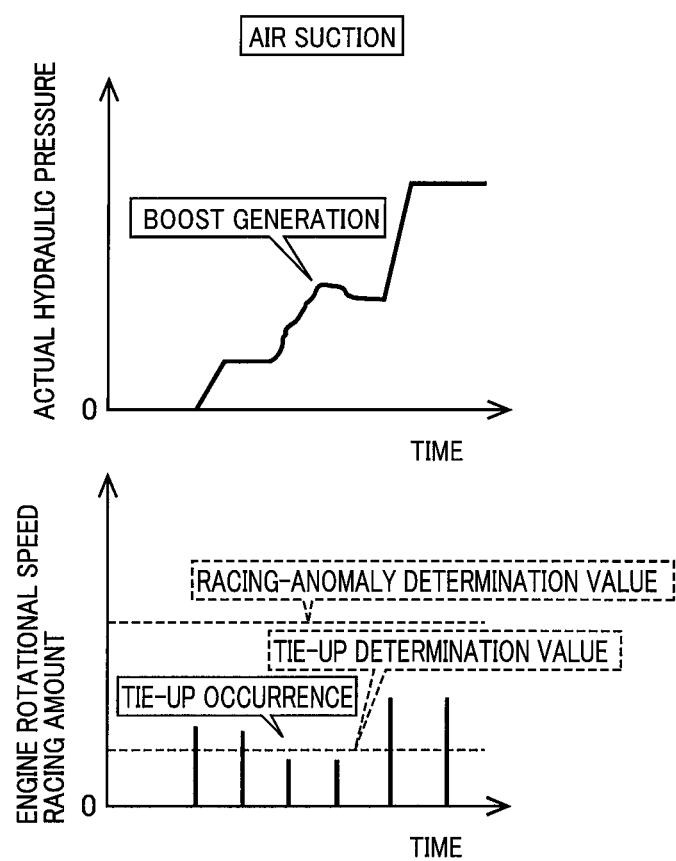
Figure 12:
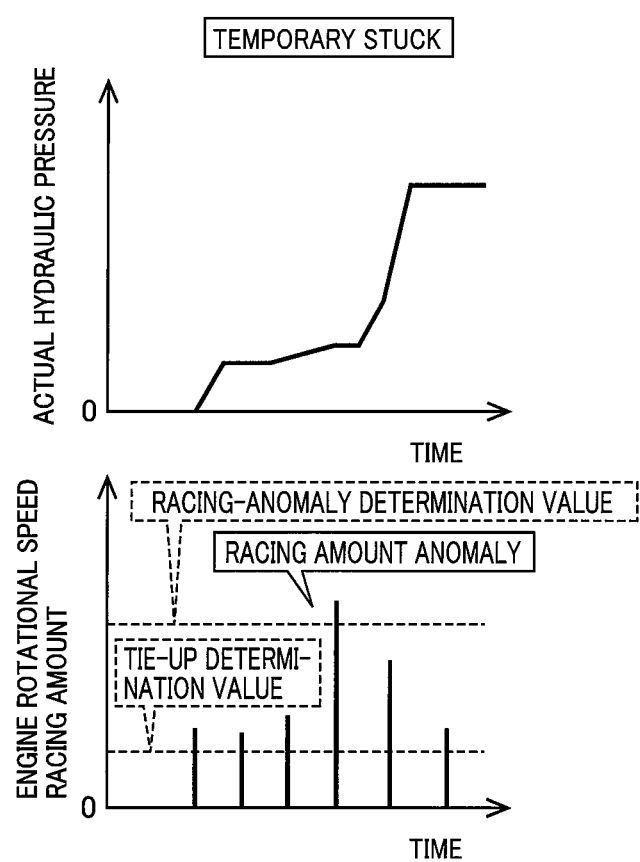
Figure 13:
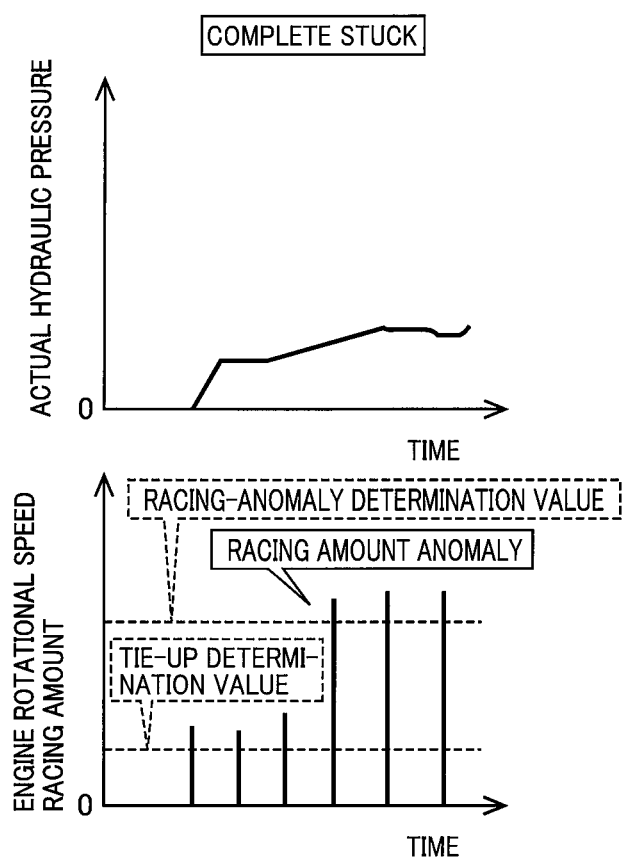

FIGS. 10, 11, 12 and 13 are views for showing, by way of examples, a normal case and anomaly cases, in an arrangement in which the hydraulic pressures Pc1, Pc2, Pb1, Pb2 are controlled directly by the respective solenoid valves S11, SL2, SL3, SL4. In a lower one of the views of each of FIGS. 10, 11, 12 and 13, a manner of chronological change of the racing amount ΔNfe of the engine rotational speed Ne, for example, in process of the 2→3 shift-up action executed in the step-variable transmission portion 20 is shown by way of example. The views of FIG. 10 show the normal case, the views of FIG. 11 show the anomaly case with a suction of air by the oil pump, the views of FIG. 12 show the anomaly case with a temporary stuck of the solenoid valve SL2, and the views of FIG. 13 show the anomaly case with a complete stuck of the solenoid valve SL2. The above-described suction of air by the oil pump is a phenomenon that the oil pump sucks the air when sucking the working fluid OIL from the oil pan 100. The above-described temporary or complete stuck of the solenoid valve SL is a phenomenon that a valve spool is stuck and not moved in the solenoid valve SL, for example, due to entrance of foreign substances. The malfunction of any one of the solenoid valves SL1-SL4 due to the suction of the air by the MOP 57 and/or MOP 58 or the occurrence of the stuck of the corresponding solenoid valve is the cause of the shifting malfunction of the step-variable transmission portion 20. With only an indication that the racing amount ΔNfe has become the abnormal value, it is difficult to specify the cause of the shifting malfunction of the step-variable transmission portion 20. However, the cause of the shifting malfunction of the step-variable transmission portion 20 can be easily specified by seeing the manner of the chronological change of the racing amount ΔNfe as shown in FIGS. 10, 11, 12 and 13.

Referring back to FIG. 1, the vehicle anomaly analysis apparatus 300 includes an anomaly-cause specifying model 310 that is prepared to indicate a relationship between the manner of the chronological change of the racing amount ΔNf of the rotational speed Nfx and the cause of the anomaly in the shift control operation of the step-variable transmission portion 20. The vehicle anomaly analysis apparatus 300 determines or specifies the cause of the anomaly in the shift control operation of the step-variable transmission portion 20, by applying the anomaly-cause specifying model 310 to the manner of the chronological change of the racing amount ΔNf upon occurrence of the anomaly in the shift control operation of the step-variable transmission portion 20. The vehicle anomaly analysis apparatus 300 is connected to the server 200 and/or the vehicle 10, for example, via a wireless communication. The vehicle anomaly analysis apparatus 300 obtains the manner of the chronological change of the racing amount ΔNf from the server 200 and/or the vehicle 10. The vehicle 10 memorizes the manner of the chronological change of the racing amount ΔNf, and transmits the manner of the chronological change of the racing amount ΔNf, to the server 200 and/or the vehicle anomaly analysis apparatus 300, as needed. The server 200 memorizes the manner of the chronological change of the racing amount $\Delta Nf$ as big data. The anomaly-cause specifying model 310 is determined or prepared, for example, by using at least one prototype vehicle 400 (see FIG. 1) that is the vehicle 10 in a prototype stage. The anomaly-cause specifying model 310 is established or realized, for example, by a supervised learning that is a machine learning using, as teaching data, the manner of the chronological change of the racing amount $\Delta Nf$ upon the occurrence of the anomaly in the shift control operation of the step-variable transmission portion 20 and the cause of the anomaly in the shift control operation of the step-variable transmission portion 20. Each of the at least one prototype vehicle 400 has basically the same construction as the vehicle 10 that is a mass-produced vehicle.

There will be described a process of constructing the anomaly-cause specifying model 310, by way of example.

The manner of the chronological change of the racing amount $\Delta Nf$ of the rotational speed Nfx does not directly reflect the suction of air by the MOP 57 and/or the EOP 58, the malfunction of the solenoid valves SL1-SL4 and the like. Therefore, a certain length of time and a certain number of personnel are required to construct the anomaly-cause specifying model 310, if the anomaly-cause specifying model 310 is intended to be constructed by specifying the cause of the anomaly in the shift control operation of the step-variable transmission portion 20, from the manner of the chronological change of the racing amount $\Delta Nf$ of the rotational speed Nfx.

The anomaly-cause specifying model 310 indicates the relationship between the manner of the chronological change of the racing amount $\Delta Nf$ of the rotational speed Nfx and, as the cause of the anomaly in the shift control operation of the step-variable transmission portion 20, a cause that is predetermined based on an operation-state representing value representing an operation state of the vehicle 10, wherein the cause of the anomaly in the shift control operation of the step-variable transmission portion 20 can be specified by the operation-state representing value, easier than by the rotational speed Nfx (particularly, the manner of the chronological change of the racing amount $\Delta Nf$ of the rotational speed Nfx).

Referring back to FIGS. 10, 11, 12 and 13, their views show, in addition to the manner of the chronological change of the racing amount $\Delta Nfe$ of the engine rotational speed Ne, a manner of chronological change of an actual pressure value (see "ACTUAL HYDRAULIC PRESSURE" in FIGS. 10, 11, 12 and 13) of the C2 hydraulic pressure Pc2 in the process of the 2→3 shift-up action of the step-variable transmission portion 20, by way of examples. In FIG. 11, "BOOST GENERATION" indicates a phenomenon that is caused as a result of entrance of air into the solenoid valve SL2 due to suction of the air by the MOP 57 and/or EOP 58. As is apparent from FIGS. 10, 11, 12 and 13, the cause of the shifting malfunction of the step-variable transmission portion 20 can be determined or specified easier by using the actual pressure value of the C2 hydraulic pressure Pc2, than by using the racing amount $\Delta Nfe$ of the engine rotational speed Ne.

That is, the engaging pressures Pcb, which are output pressures of the respective solenoid valves SL1-SL4, more precisely reflect the malfunction of the solenoid valves SL1-SL4 and the like, than the manner of the chronological change of the racing amount $\Delta Nf$ of the rotational speed Nfx. Therefore, the cause of the anomaly in the shift control operation of the step-variable transmission portion 20 can be specified easier by seeing the engaging pressures Pcb, than by seeing the manner of the chronological change of the racing amount $\Delta Nf$ of the rotational speed Nfx. The above-described operation-state representing value is a value of each of the engaging pressure Pcb. As the cause of the shifting malfunction of the step-variable transmission portion 20, there is also an anomaly of the drive unit 89 such as a short-circuit in the drive unit 89. Since the operation state of each of the solenoid valves SL1-SL4 can be easily known by seeing a corresponding one of the engaging pressures Pcb, the cause of the shifting malfunction of the step-variable transmission portion 20 that includes the anomaly of the drive unit 89 can be easily specified by seeing the value of each of the engaging pressures Pcb as the above-described operation-state representing value.

There is a case in which the hydraulic pressure sensors 78 are not installed in the vehicle 10, for example, due to a cost limitation. In such a case, too, the anomaly-cause specifying model 310 can be appropriately constructed by detecting the engaging pressures Pcb through hydraulic pressure sensors (hydraulic pressure sensor set) 402 which are installed in each of the at least one prototype vehicle 400 and which are equivalent to the hydraulic pressure sensors 78. This method for constructing the anomaly-cause specifying model 310 is useful in the case in which the hydraulic pressure sensors 78 are not installed in the vehicle 10. For convenience of the following description, sensors, which are installed in each of the at least one prototype vehicle 400 and which are equivalent to various sensors installed in the vehicle 10 and other than the hydraulic pressure sensors 78, will be referred to as "other sensors 404", so as to be distinguished from the hydraulic pressure sensors 402.

The vehicle 10 is provided with some kinds of sensors such as the engine speed sensor 60, output speed sensor 62, MG2 speed sensor 66, accelerator-opening degree sensor 68 and G sensor 74, although these are limited kinds of sensors. The supervised learning as the machine learning is executed, with data of detected values of the other sensors 404 (that are equivalent to the various sensors installed in the vehicle 10) upon occurrence of the anomaly in the shift control operation of the step-variable transmission portion 20 being inputted, and with the cause of the anomaly in the shift control operation being outputted.

Referring back to FIG. 1, the vehicle anomaly analysis apparatus 300 includes a so-called microcomputer incorporating a CPU, a ROM, a RAM and an input-output interface. The CPU performs various control operations, by processing various input signals, according to control programs stored in the ROM, while utilizing a temporary data storage function of the RAM. The vehicle anomaly analysis apparatus 300 includes a calculation portion 302 and an indication portion 304. The calculation portion 302 is an artificial intelligence including a database portion 306 configured to store data and an inference portion 308 configured to infer a conclusion from the stored data. The anomaly-cause specifying model 310 is realized by the supervised learning executed by the calculation portion 302. The indication portion 304 is an output device such as a display, a printer and the like, which is configured to indicate, for example, result of the calculation or processing made by the calculation portion 302.

Figure 14:
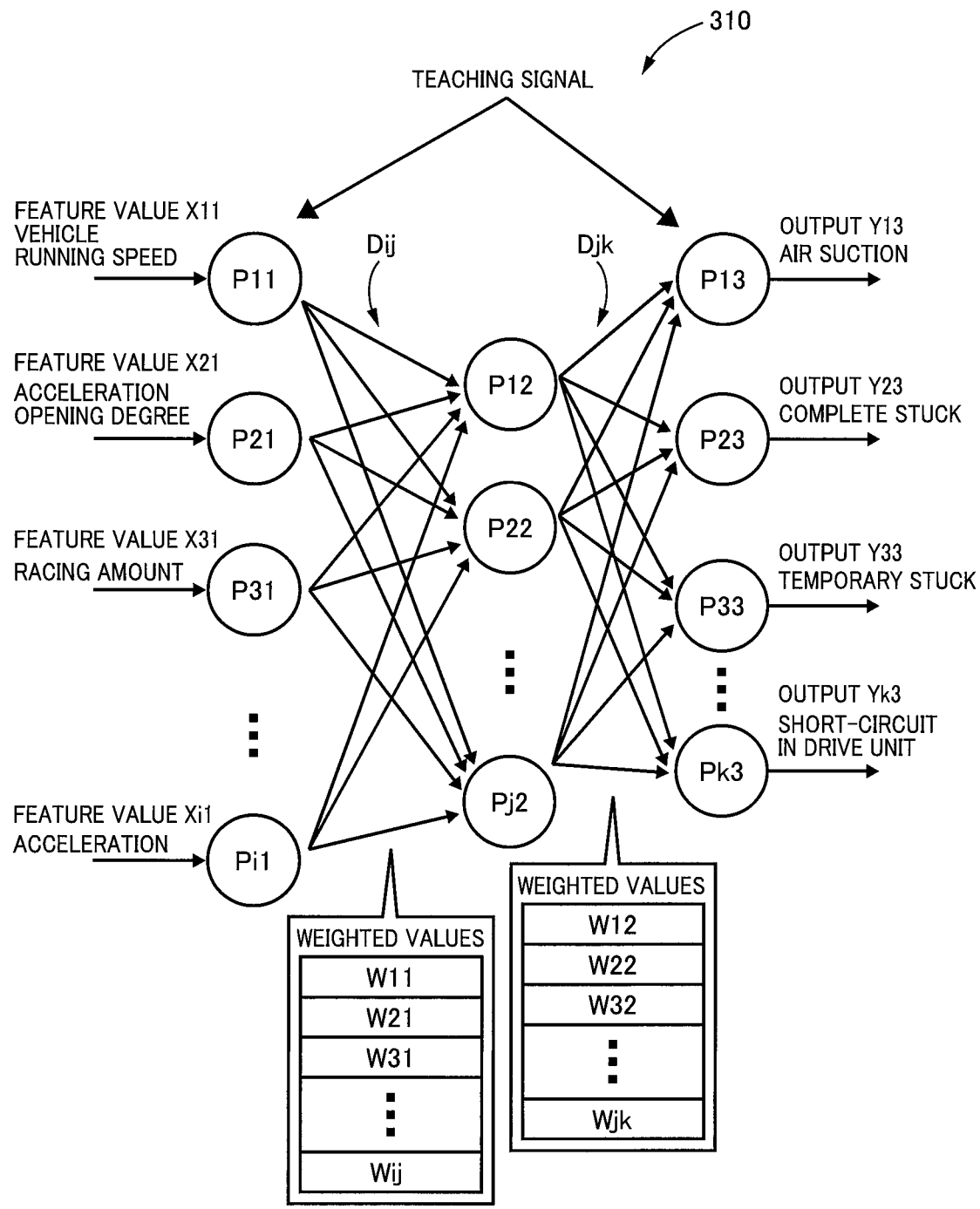
FIG. 14 is a view for showing, by way of example, an anomaly-cause specifying model.

FIG. 14 is a view showing the anomaly-cause specifying model 310 by way of example. The anomaly-cause specifying model 310 shown in FIG. 14 is a neutral network based on kinds of the detected values of the sensors provided in the vehicle 10. The anomaly-cause specifying model 310 is a model that can be constituted by simulating a nerve cell group of a living body, through software by computer program or hardware consisting of combination of electronic elements. The anomaly-cause specifying model 310 is a multi-layer structure consisting of an input layer constituted by i pieces of nerve cell elements (=neurons) Pi1 (P11-Pi1), an intermediate layer constituted by j pieces of nerve cell elements Pj2 (P12-Pj2) and an output layer constituted by k pieces of nerve cell elements Pk3 (P13-Pk3). The intermediate layer may be a multi-layer structure. For transmitting states of the nerve cell elements from the input layer to the output layer, the anomaly-cause specifying model 310 is provided with transfer elements Dij for coupling the i pieces of nerve cell elements Pi1 and the j pieces of nerve cell elements Pj2 through coupling coefficients, i.e., weighted values Wij, and transfer elements Dik for coupling the j pieces of nerve cell elements Pj2 and the k pieces of nerve cell elements Pk3 through weighted values Wik.

The anomaly-cause specifying model 310 is an anomaly analysis system in which the weighted values Wij, Wjk are subjected to the machine learning through a predetermined algorithm. In the supervised learning for the anomaly-cause specifying model 310, teaching data, i.e., teaching signals obtained in the at least one prototype vehicle 400 are used. The data of the detected values of the other sensors 404 upon occurrence of the anomaly in the shift control operation of the step-variable transmission portion 20 in each of the at least one prototype vehicle 400 are provided as the teaching signal to the input layer (see "X11-Xi1" in FIG. 14). Meanwhile, the causes of the anomaly in the shift control operation of the step-variable transmission portion 20, which are obtained based on the detected values of the hydraulic pressure sensors 402 in each of the at least one prototype vehicle 400, are provided as the teaching signals to the output layer (see "Y13-Yk3" in FIG. 14). In examples shown in FIGS. 10, 11, 12 and 13, for example, there is a strong correlation between each of the manners of the chronological change of the racing amount ΔNfe of the engine rotational speed Ne in the process of the shift control operation executed in the step-variable transmission portion 20 and a corresponding one of the causes of the anomaly in the shift control operation of the step-variable transmission portion 20, so that large weighted values Wij, Wjk are given to such a correlation. In the analysis using the artificial intelligence, at least the correlation must be known. Regarding the data of the detected values of the other sensors 404, the cause of the anomaly can be easily specified by using the detected values changed chronologically, than by using data at a certain point of time, as shown in FIGS. 10, 11, 12 and 13 by way of example. The detected values of the other sensors 404 that are chronologically changed are provided as teaching signals to the input layer. As described above, the anomaly-cause specifying model 310 is a learning model that indicates relationships between detected values of the other sensors 404 upon occurrence of anomalies in the at least one prototype vehicle 400 and causes of the anomalies specified based on detected values of the hydraulic pressure sensors 402 in the at least one prototype vehicle 400, wherein the relationships are predetermined by using the at least one prototype vehicle 400.

The vehicle anomaly analysis apparatus 300 includes a state determining means or portion in the form of a state determining portion 312 and an anomaly-cause specifying means of portion in the form of an anomaly-cause specifying portion 314, for performing a control function for improving accuracy in specifying the cause of the anomaly in the shift control operation of the step-variable transmission portion 20.

The state determining portion 312 is configured to make determination as to whether an anomaly has occurred or not, in the shift control operation of the step-variable transmission portion 20 of each of the vehicles 10 in market or field. The state determining portion 312 makes this determination, depending on whether the electronic control apparatus 90 of each of the vehicles 10 determines that the anomaly has occurred or not, in the shift control operation of the step-variable transmission portion 20 of the each of the vehicles 10. The electronic control apparatus 90 is configured to determine whether the anomaly has occurred or not, in the shift control operation of the step-variable transmission portion 20, depending on the detected values of the various sensors which are other than the hydraulic pressure sensors 78 and which represent the operation state of each of the vehicles 10. Alternatively, the state determining portion 312 may make the above determination, depending on the detected values of the various sensors which are other than the hydraulic pressure sensors 78 and which are provided in each of the vehicles 10, wherein the detected values are obtained from the server 200. Described specifically, where the anomaly occurring in the shift control operation of the step-variable transmission portion 20 of each of the vehicles 10 is the shifting malfunction of the step-variable transmission portion 20, it is determined whether the shifting malfunction of the step-variable transmission portion 20 has occurred or not, depending on whether the racing amount ΔNf of the rotational speed Nfx has become not smaller than the racing-anomaly determination value ΔNffx or not, in the process of the shift control operation, after completion of the learning control operation executed in the shift control operation of the step-variable transmission portion 20, and/or depending on whether the racing amount ΔNf of the rotational speed Nfx has become not larger than the tie-up determination value ΔNftu or not, in the process of the shift control operation, after completion of the learning control operation executed in the shift control operation of the step-variable transmission portion 20. Alternatively, it is determined whether the shifting malfunction of the step-variable transmission portion 20 has occurred or not, depending on whether the shifting shock causing the longitudinal acceleration Gx to be not lower than the above-described predetermined acceleration value has been generated or not, in the process of the shift control operation, after completion of the learning control operation executed in the shift control operation of the step-variable transmission portion 20. Thus, the vehicle anomaly analysis apparatus 300 makes the determination as to whether the anomaly has occurred or not, in the shift control operation of the step-variable transmission portion 20 of each of the vehicles 10, based on the detected values of the various sensors which are other than the hydraulic pressure sensors 78 and which are provided in each of the vehicles 10.

The anomaly-cause specifying portion 314 is configured, when it is determined by the state determining portion 312 that the anomaly has occurred in the shift control operation of the step-variable transmission portion 20 in at least one of the vehicles 10, to obtain, from the at least one of the vehicles 10 via a certain network, the big data of the at least one of the vehicles 10 upon occurrence of the anomaly in the shift control operation. The big data of the at least one of the vehicles 10 obtained from the at least one of the vehicles 10 are, for example, big data of the at least one of the vehicles 10 transmitted directly from the at least one of the vehicles 10 and/or big data of the at least one of the vehicles 10 transmitted indirectly from the at least one of the vehicles 10 via the server 200. The indirectly transmitted big data of the at least one of the vehicles 10 are, for example, big data of the at least one of the vehicles 10 transmitted via only the server 200 or big data of the at least one of the vehicles 10 transmitted from the at least one of the vehicles 10 to the server 200 and stored in the server 200. As described above, the data of the detected values of the other sensors 404, which are chronologically changed, are provided as teaching signals to the input layer of the anomaly-cause specifying model 310, and the big data of the at least one of the vehicles 10 are data representing the manner of the chronological change of each of the detected values of the various sensors that are other than the hydraulic pressure sensors 78, wherein the data are stored in each of the at least one of the vehicles 10. Therefore, the manner of the chronological change of each of the detected values of the various sensors other than the hydraulic pressure sensors 78 is used for specifying the cause of the anomaly in the shift control operation.

The anomaly-cause specifying portion 314 is configured to analyze the cause of the anomaly having occurred in the shift control operation of the step-variable transmission portion 20 of each of the at least one of the vehicles 10, by using the obtained big data of the at least one of the vehicles 10 and the anomaly-cause specifying model 310. That is, the anomaly-cause specifying portion 314 inputs the obtained big data of the at least one of the vehicles 10 into the anomaly-cause specifying model 310, and analyzes the cause of the anomaly in the shift control operation of the step-variable transmission portion 20.

Further, the anomaly-cause specifying portion 314 determines whether the cause of the anomaly in the shift control operation of the step-variable transmission portion 20 could have been specified or not. When determining that the cause of the anomaly in the shift control operation could have been specified, the anomaly-cause specifying portion 314 indicates the specified cause of the anomaly in the indication portion 304 or the like. It is ideal that the specified cause of the anomaly in the shift control operation is limited to a single cause. However, in a case in which there are a plurality of possible candidates of the cause of the anomaly, the candidates of the cause are arranged in an order of probability of each of the candidates, which is obtained through analysis of the anomaly. When determining that the cause of the anomaly in the shift control operation cannot be specified, the anomaly-cause specifying portion 314 indicates that the cause of the anomaly is unknown or unspecified in the indication portion 304 or the like.

Figure 15:
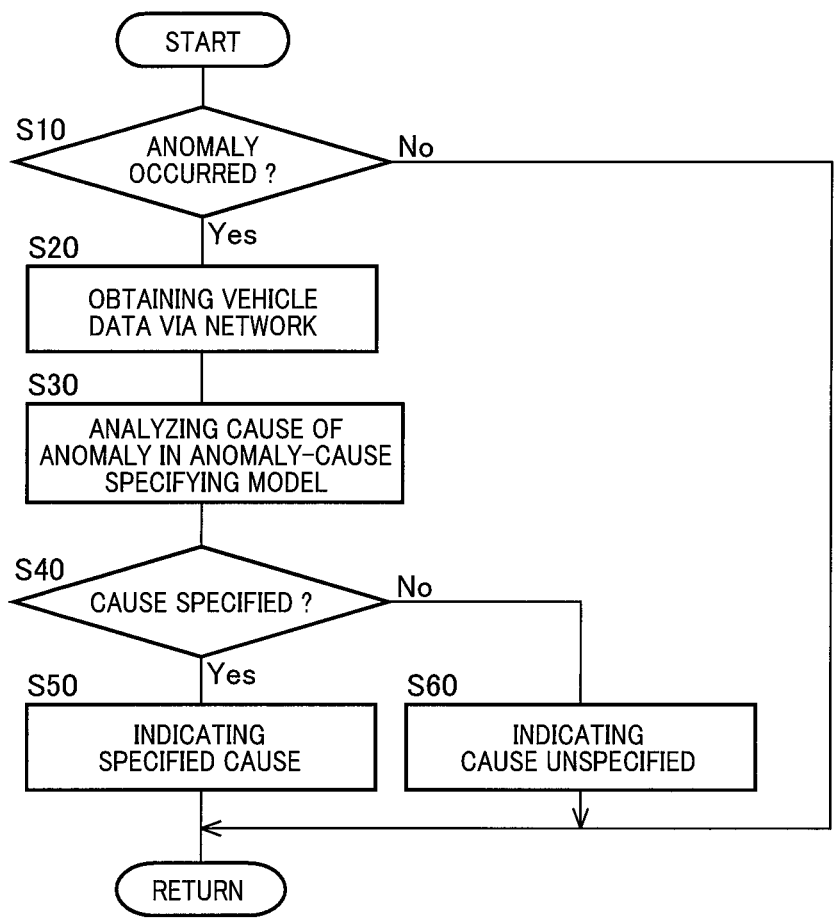
FIG. 15 is a flow chart showing a main part of a control routine executed by a vehicle anomaly analysis apparatus, namely, a control routine that is executed for specifying cause of an anomaly in the shift control operation executed in the step-variable transmission portion, with an improved accuracy.

FIG. 15 is a flow chart showing a main part of a control routine executed by the vehicle anomaly analysis apparatus 300, namely, a control routine that is executed for specifying the cause of the anomaly in the shift control operation executed in the step-variable transmission portion 200, with an improved accuracy in specifying cause of the anomaly. This control routine is executed, for example, in a repeated manner.

As shown in FIG. 15, the control routine is initiated with step S10 corresponding to function of the state determining portion 312, which is implemented to determine whether the anomaly has occurred in the shift control operation of the step-variable transmission portion 20 of at least one of the vehicles 10 in market or field. When a negative determination is made at step S10, one cycle of execution of the control routine is completed. When an affirmative determination is made at step S10, step S20 corresponding to function of the anomaly-cause specifying portion 314 is implemented to obtain the big data of the at least one of the vehicles 10 upon occurrence of the anomaly in the shift control operation via the network. Step S20 is followed by step S30 corresponding to function of the anomaly-cause specifying portion 314, which is implemented to input the obtained big data of the at least one of the vehicles 10, into the anomaly-cause specifying model 310 as the anomaly analysis system, and then to analyze the cause of the anomaly in the shift control operation in the anomaly-cause specifying model 310. Step S30 is followed by step S40 corresponding to function of the anomaly-cause specifying portion 314, which is implemented to determine whether the cause of the anomaly in the shift control operation has been specified or not. When an affirmative determination is made at step S40, step S50 corresponding to function of the anomaly-cause specifying portion 314 is implemented to indicate the specified cause of the anomaly in the shift control operation. When a negative determination is made at step S40, the control flow goes to step S60 corresponding to function of the anomaly-cause specifying portion 314, which is implemented to indicate that the cause of the anomaly is unspecified.

As described above, in the present embodiment, the cause of the anomaly in the shift control operation of the step-variable transmission portion 20 is determined or specified, by applying the predetermined anomaly-cause specifying model 310 that indicates the relationship between the manner of the chronological change of the racing amount $\Delta Nf$ of the rotational speed $Nfx$ and the cause of the anomaly in the shift control operation of the step-variable transmission portion 20, to the manner of the chronological change of the racing amount $\Delta Nf$ of the rotational speed $Nfx$ upon occurrence of the anomaly in the shift control operation of the step-variable transmission portion 20, so that it is possible to improve accuracy in specifying the cause of the anomaly in the shift control operation of the step-variable transmission portion 20.

In the present embodiment, the anomaly-cause specifying model 310 is realized by the supervised learning that is the machine learning using, as the teaching data, the manner of the chronological change of the racing amount $\Delta Nf$ of the rotational speed $Nfx$ upon the occurrence of the anomaly in the shift control operation of the step-variable transmission portion 20 and the cause of the anomaly in the shift control operation of the step-variable transmission portion 20, so that it is possible to construct a learning model by which the cause of the anomaly in the shift control operation of the step-variable transmission portion 20 can be specified with an improved accuracy.

In the present embodiment, the anomaly in the shift control operation of the step-variable transmission portion 20 is the shifting malfunction of the step-variable transmission portion 20, so that the cause of the shifting malfunction of the step-variable transmission portion 20 can be specified with an improved accuracy by using the anomaly-cause specifying model 310.

In the present embodiment, the cause of the anomaly in the shift control operation of the step-variable transmission portion 20 is the suction of the air by the MOP 57 and/or the EOP 58, the malfunction of the solenoid valves SL1-SL4, and/or the malfunction of the drive unit 89. Therefore, even in event of occurrence of the anomaly in the shift control operation of the step-variable transmission portion 20, which causes the racing amount $\Delta Nf$ of the rotational speed $Nfx$ to become an abnormal value, the cause of the anomaly can be specified with an improved accuracy by using the anomaly-cause specifying model 310.

In the present embodiment, the anomaly-cause specifying model 310 indicates the relationship between the manner of the chronological change of the racing amount $\Delta Nf$ of the rotational speed $Nfx$ and, as the cause of the anomaly in the shift control operation of the step-variable transmission portion 20, the cause that is predetermined based on the operation-state representing value, wherein the cause of the anomaly in the shift control operation of the step-variable transmission portion 20 can be specified by the operation-state representing value, easier than by the rotational speed Nfx. Therefore, the cause of the anomaly in the shift control operation of the step-variable transmission portion 20 can be specified with an improved accuracy in the anomaly-cause specifying model 310.

In the present embodiment, the above-described operation-state representing value is the value of the engaging pressure Pcb, so that the cause of the anomaly in the shift control operation of the step-variable transmission portion 20 can be appropriately specified in the anomaly-cause specifying model 310.

There will be described another embodiment of this invention. The same reference signs as used in the above-described first embodiment will be used in the following second embodiment, to identify the functionally corresponding elements, and descriptions thereof are not provided.

Second Embodiment

In the above-described first embodiment, the suction of the air by the MOP 57 and/or the EOP 58, the malfunction of the solenoid valves SL1-SL4 and the anomaly of the drive unit 89 have been described, by way of example, as the cause of the anomaly in the shift control operation of the step-variable transmission portion 20. In the following description of this second embodiment, there will be described reduction of durability of the step-variable transmission portion 20 as the cause of the anomaly in the shift control operation of the step-variable transmission portion 20. The reduction of the durability of the step-variable transmission portion 20 is, for example, reduction of durability of friction members of the engagement devices CB and temporary malfunctions of the engagement devices CB due to, for example, increased temperatures of the friction members of the engagement devices CB. The reduction of the durability of the step-variable transmission portion 20 highly correlates with, for example, the number of occurrences of the anomaly in the shift control operation of the step-variable transmission portion 20, which is determined by the state determining portion 312.

Figure 16:
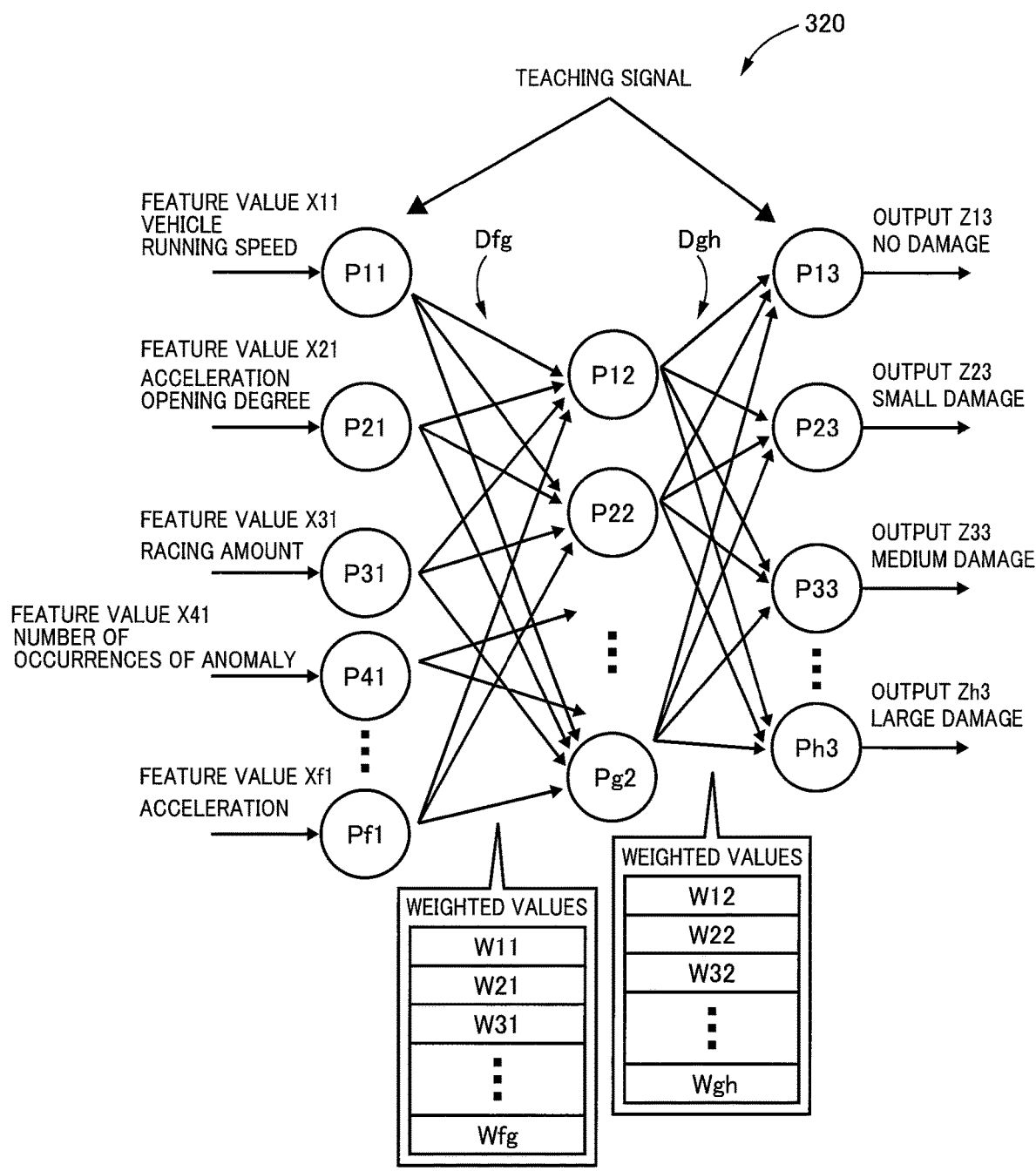
FIG. 16 is a view for showing, by way of example, an anomaly-cause specifying model in an embodiment of the present invention, which is other than an embodiment shown in FIG. 14.

In this second embodiment, the vehicle anomaly analysis apparatus 300 includes an anomaly-cause specifying model 320 shown in FIG. 16, in addition to or in place of the above-described anomaly-cause specifying model 310. The anomaly-cause specifying model 320 further indicates a relationship between the number of occurrences of the anomaly in the shift control operation of the step-variable transmission portion 20 and the cause of the anomaly in the shift control operation of the step-variable transmission portion 20. The anomaly-cause specifying model 320 is established or realized, for example, by the supervised learning that is the machine learning using, as the teaching data, the manner of the chronological change of the racing amount ΔNf upon the occurrence of the anomaly in the shift control operation of the step-variable transmission portion 20, the number of occurrences of the anomaly in the shift control operation of the step-variable transmission portion 20 and the reduction of the durability of the step-variable transmission portion 20. The reduction of the durability of the step-variable transmission portion 20 is represented, for example, by a degree or size of damage on the friction member of each of the engagement devices CB. In principle, the racing amount ΔNf is increased with increase of the damage, and the racing occurs at increased frequency with increase of the damage.

The anomaly-cause specifying model 320 shown in FIG. 16 is a neutral network as the above-described anomaly-cause specifying model 310. The anomaly-cause specifying model 320 is a multi-layer structure consisting of an input layer constituted by f pieces of nerve cell elements Pf1 (P11-Pf1), an intermediate layer constituted by g pieces of nerve cell elements Pg2 (P12-Pg2) and an output layer constituted by h pieces of nerve cell elements Ph3 (P13-Ph3). Further, the anomaly-cause specifying model 320 is provided with transfer elements Dfg for coupling the f pieces of nerve cell elements Pf1 and the g pieces of nerve cell elements Pg2 through weighted values Wfg, and transfer elements Dgh for coupling the g pieces of nerve cell elements Pg2 and the h pieces of nerve cell elements Ph3 through weighted values Wgh.

The anomaly-cause specifying model 320 is an anomaly analysis system in which the weighted values Wfg, Wgh are subjected to the machine learning through a predetermined algorithm. In the supervised learning for the anomaly-cause specifying model 310, teaching data, i.e., teaching signals obtained in the at least one prototype vehicle 400 are used. The data of the detected values of the other sensors 404 upon occurrence of the anomaly in the shift control operation of the step-variable transmission portion 20 in each of the at least one prototype vehicle 400 and also the number of occurrences of the anomaly in the shift control operation of the step-variable transmission portion 20 in each of the at least one prototype vehicle 400 are provided as the teaching signal to the input layer (see "X11-Xf1" in FIG. 16). Meanwhile, the causes of the anomaly in the shift control operation of the step-variable transmission portion 20, which are obtained based on the detected values of the hydraulic pressure sensors 402 in each of the at least one prototype vehicle 400, are provided as the teaching signals to the output layer (see "Z13-Zh3" in FIG. 16). There is a strong correlation between each of the manners of the chronological change of the racing amount ΔNfe of the engine rotational speed Ne in the process of the shift control operation executed in the step-variable transmission portion 20 and a corresponding degree of reduction of the durability of the step-variable transmission portion 20, and also a strong correlation between each number of the occurrences of the anomaly in the shift control operation of the step-variable transmission portion 20 and a corresponding degree of reduction of the durability of the step-variable transmission portion 20, so that so that large weighted values Wij, Wjk are given to such correlations.

As described above, as in the above-described first embodiment, in the present second embodiment, it is possible to improve the accuracy in specifying the cause of the anomaly in the shift control operation of the step-variable transmission portion 20.

In the present second embodiment, the anomaly-cause specifying model 320 further indicates the relationship between the number of occurrences of the anomaly in the shift control operation of the step-variable transmission portion 20 and the reduction of the durability of the step-variable transmission portion 20. Therefore, even where the cause of the anomaly in the shift control operation of the step-variable transmission portion 20 is the reduction of the durability of the step-variable transmission portion 20, the cause of the anomaly can be specified with an improved accuracy by using the anomaly-cause specifying model 320.

In the present second embodiment, the anomaly-cause specifying model 320 is realized by the supervised learning that is the machine learning using, as the teaching data, the manner of chronological change of the racing amount ΔNf of the rotational speed Nfx upon the occurrence of the anomaly in the shift control operation of the step-variable transmission portion 20, the number of occurrences of the anomaly in the shift control operation of the step-variable transmission portion 20 and the reduction of the durability of the step-variable transmission portion 20. Therefore, it is possible to construct a learning model by which the cause of the anomaly in the shift control operation of the step-variable transmission portion 20 can be specified with an improved accuracy.

While the preferred embodiments of this invention have been described in detail by reference to the drawings, it is to be understood that the invention may be otherwise embodied.

For example, in the above-described embodiments, the vehicle anomaly analysis apparatus 300 is an external apparatus provided apart from the vehicle 10. However, this is not essential. For example, a part or an entirety of the function for the specifying the cause of the anomaly in the shift control operation of the step-variable transmission portion 20, which is provided in the vehicle anomaly analysis apparatus 300 in the above-described embodiments, may be provided in the server 200, or in the vehicle 10 (particularly, in the electronic control apparatus 90). Further, the content of the cause of the anomaly in the shift control operation of the step-variable transmission portion 20 may be indicated or displayed in a monitor or the like that is provided apart from the vehicle anomaly analysis apparatus 300, or in a monitor or the like of a personal computer connected to the server 200 through a certain network. Further, the content of the cause of the anomaly may be indicated or displayed in the information notification device 88 or the like provided in the vehicle 10. It is noted that the vehicle anomaly analysis apparatus 300 is used, for example, when the vehicle 10 is brought to a maintenance workshop, or is used in a manufacturer of the vehicle 10.

In the above-described embodiments, the anomaly-cause specifying models 310, 320 are realized in the calculation portion 302 as the artificial intelligence. However, this is not essential. For example, each of the anomaly-cause specifying models 310, 320 can be realized by a computer or the like that is not based on a neutral network.

In the above-described embodiments, the vehicle 10 including the transmission device 40 has been described as an example of the vehicle in which the anomaly could occur in the shift control operation of the step-variable transmission portion 20. However, the present invention is applicable not only to the vehicle 10 but also to any other vehicle in which an anomaly could occur in a shift control operation of an automatic transmission included in the vehicle.

It is to be understood that the embodiments described above are given for illustrative purpose only, and that the present invention may be embodied with various modifications and improvements which may occur to those skilled in the art.

NOMENCLATURE OF ELEMENTS

10: vehicle
14: engine (drive force source)
20: mechanically-operated step-variable transmission portion (automatic transmission)
28: drive wheels
40: transmission device (automatic transmission)
57: MOP (oil pump)
58: EOP (oil pump)
89: drive unit
300: vehicle anomaly analysis apparatus
310: anomaly-cause specifying model
320: anomaly-cause specifying model
CB: engagement devices (frictional engagement devices)
MG2: second rotating machine (drive force source)
SL1-SL4: solenoid valves (control valves)

What is claimed is:

1. A vehicle anomaly analysis apparatus for analyzing an anomaly having occurred in a shift control operation executed in an automatic transmission that constitutes a part of a drive-force transmission path between a drive force source and drive wheels of a vehicle, by using a rotational speed changed in process of execution of the shift control operation,
wherein the vehicle anomaly analysis apparatus is configured to specify cause of the anomaly in the shift control operation, by applying a predetermined anomaly-cause specifying model that indicates a relationship between a manner of chronological change of a racing amount and the cause of the anomaly in the shift control operation, to the manner of the chronological change of the racing amount upon occurrence of the anomaly in the shift control operation, the racing amount being an amount of increase of the rotational speed in the process of the execution of the shift control operation, relative to a reference rotational speed that is based on a gear ratio and an output rotational speed of the automatic transmission.

2. The vehicle anomaly analysis apparatus according to claim 1,
wherein the anomaly-cause specifying model is realized by a supervised learning that is a machine learning using, as teaching data, the manner of chronological change of the racing amount upon the occurrence of the anomaly in the shift control operation and the cause of the anomaly in the shift control operation.

3. The vehicle anomaly analysis apparatus according to claim 1,
wherein the anomaly in the shift control operation is shifting malfunction of the automatic transmission that includes a hydraulically-operated frictional engagement device, and
wherein an operation state of the frictional engagement device is to be switched in the execution of the shift control operation.

4. The vehicle anomaly analysis apparatus according to claim 3,
wherein the cause of the anomaly in the shift control operation is suction of air by an oil pump that is provided to output a working fluid used to switch the operation state of the frictional engagement device.

5. The vehicle anomaly analysis apparatus according to claim 3,
wherein the cause of the anomaly in the shift control operation is malfunction of a control valve that is provided to regulate a hydraulic pressure of a working fluid used to switch the operation state of the frictional engagement device.

6. The vehicle anomaly analysis apparatus according to claim 3,
wherein the cause of the anomaly in the shift control operation is malfunction of a drive unit configured to drive a control valve that is provided to regulate a hydraulic pressure of a working fluid used to switch the operation state of the frictional engagement device.

7. The vehicle anomaly analysis apparatus according to claim 1,
wherein the anomaly-cause specifying model indicates the relationship between the manner of the chronological change of the racing amount and, as the cause of the anomaly in the shift control operation, a cause that is predetermined based on an operation-state representing value representing an operation state of the vehicle, and
wherein the cause of the anomaly in the shift control operation is to be specified by the operation-state representing value, easier than by the rotational speed.

8. The vehicle anomaly analysis apparatus according to claim 7,
wherein the operation-state representing value is a value of a hydraulic pressure of a working fluid used to switch an operation state of a hydraulically-operated frictional engagement device included in the automatic transmission, in the execution of the shift control operation.

9. The vehicle anomaly analysis apparatus according to claim 1,
wherein the anomaly-cause specifying model further indicates a relationship between a number of occurrences of the anomaly in the shift control operation and the cause of the anomaly in the shift control operation, and
wherein the cause of the anomaly in the shift control operation is reduction of durability of the automatic transmission.

10. The vehicle anomaly analysis apparatus according to claim 9,
wherein the anomaly-cause specifying model is realized by a supervised learning that is a machine learning using, as teaching data, the manner of chronological change of the racing amount upon the occurrence of the anomaly in the shift control operation, the number of occurrences of the anomaly in the shift control operation and the reduction of the durability of the automatic transmission.

11. The vehicle anomaly analysis apparatus according to claim 1, comprising:
a state determining portion configured to determine whether the anomaly has occurred in the shift control operation executed in the automatic transmission of the vehicle; and
an anomaly-cause specifying portion configured, when it is determined by the state determining portion that the anomaly has occurred in the shift control operation executed in the automatic transmission of the vehicle, to obtain data representing at least the manner of the chronological change of the racing amount upon the occurrence of the anomaly in the shift control operation, and to specify the cause of the anomaly in the shift control operation, by using the obtained data and the anomaly-cause specifying model.

* * * * *